United States Patent
Cao et al.

(10) Patent No.: US 10,997,394 B2
(45) Date of Patent: May 4, 2021

(54) FINGERPRINT INFORMATION OBTAINING METHOD AND FINGERPRINT RECOGNITION APPARATUS

(71) Applicant: HUAWEI TECHNOLOGIES CO., LTD., Shenzhen (CN)

(72) Inventors: Huajun Cao, Shenzhen (CN); Liang Yuan, Dongguan (CN); Hongrui Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/852,573

(22) Filed: Apr. 20, 2020

(65) Prior Publication Data

US 2020/0250391 A1 Aug. 6, 2020

Related U.S. Application Data

(63) Continuation of application No. PCT/CN2018/110776, filed on Oct. 18, 2018.

(30) Foreign Application Priority Data

Oct. 20, 2017 (CN) .......................... 201710996402.5
Jun. 22, 2018 (CN) .......................... 201810654363.5

(51) Int. Cl.
G06K 9/00 (2006.01)

(52) U.S. Cl.
CPC ........... *G06K 9/001* (2013.01); *G06K 9/0004* (2013.01); *G06K 9/00026* (2013.01)

(58) Field of Classification Search
CPC .. G06K 9/001; G06K 9/00026; G06K 9/0004; G06F 3/041
See application file for complete search history.

(56) References Cited

U.S. PATENT DOCUMENTS

| 6,003,058 A | 12/1999 | Kirschenbaum et al. |
| 2011/0262013 A1* | 10/2011 | Rahmes ................. G06K 9/001 382/125 |

(Continued)

FOREIGN PATENT DOCUMENTS

| CN | 103135874 A | 6/2013 |
| CN | 102436365 B | 4/2014 |

(Continued)

OTHER PUBLICATIONS

Emiko Sano et al. Fingerprint Authentication Device Based on Optical Characteristics Inside a Finger, Proceedings of the 2006 Conference on Computer Vision and Pattern Recognition Workshop (CVPRW 06), IEEE. Total 6 pages.

(Continued)

*Primary Examiner* — Abhishek Sarma
(74) *Attorney, Agent, or Firm* — Kilpatrick Townsend & Stockton LLP

(57) ABSTRACT

A terminal display scanning method for optical fingerprint recognition is provided, the method includes: if a start operation on a terminal screen is detected, obtaining a first vector set, where the first vector set includes A data vectors that are mutually orthogonal or mutually quasi-orthogonal, each of the data vectors includes a plurality of data elements, and A is an integer greater than 1; sequentially using the data elements in each of the data vectors to control light emitting of minimum pixel units in a fingerprint recognition area until controlling light emitting of all the minimum pixel units in the fingerprint recognition area is completed, to obtain a second vector set corresponding to the fingerprint recognition area, where the second vector set carries fingerprint information; and demodulating the second vector set by using the first vector set to obtain all fingerprint information in the fingerprint recognition area.

20 Claims, 12 Drawing Sheets

(56) References Cited

U.S. PATENT DOCUMENTS

| | | |
|---|---|---|
| 2014/0036168 A1 | 2/2014 | Ludwig |
| 2016/0078270 A1 | 3/2016 | Lee et al. |
| 2016/0266695 A1 | 9/2016 | Bae et al. |
| 2016/0283772 A1 | 9/2016 | Nelson |
| 2017/0193269 A1 | 7/2017 | Lin et al. |
| 2017/0220838 A1 | 8/2017 | He et al. |
| 2017/0270342 A1 | 9/2017 | He et al. |
| 2018/0025199 A1* | 1/2018 | Ryshtun .................. G06K 9/001 382/125 |
| 2018/0157890 A1 | 6/2018 | Hillmann et al. |
| 2018/0173926 A1 | 6/2018 | Wang et al. |
| 2018/0211085 A1 | 7/2018 | Liu et al. |
| 2018/0314872 A1 | 11/2018 | Ding et al. |

FOREIGN PATENT DOCUMENTS

| | | |
|---|---|---|
| CN | 104933421 A | 9/2015 |
| CN | 105678255 A | 6/2016 |
| CN | 106022292 A | 10/2016 |
| CN | 106469303 A | 3/2017 |
| CN | 206224518 U | 6/2017 |
| CN | 106991366 A | 7/2017 |
| CN | 107004130 A | 8/2017 |
| CN | 206431645 U | 8/2017 |
| DE | 102015115484 B3 | 1/2017 |
| JP | 2003256820 A | 9/2003 |
| KR | 20160103598 A | 9/2016 |
| WO | 2015140600 A1 | 9/2015 |

OTHER PUBLICATIONS

Yin Desen:"Research on Fingerprint Acquisition Technology Based on Microprism", Police Technology, May 2015. total 4 pages. With English abstract.

* cited by examiner

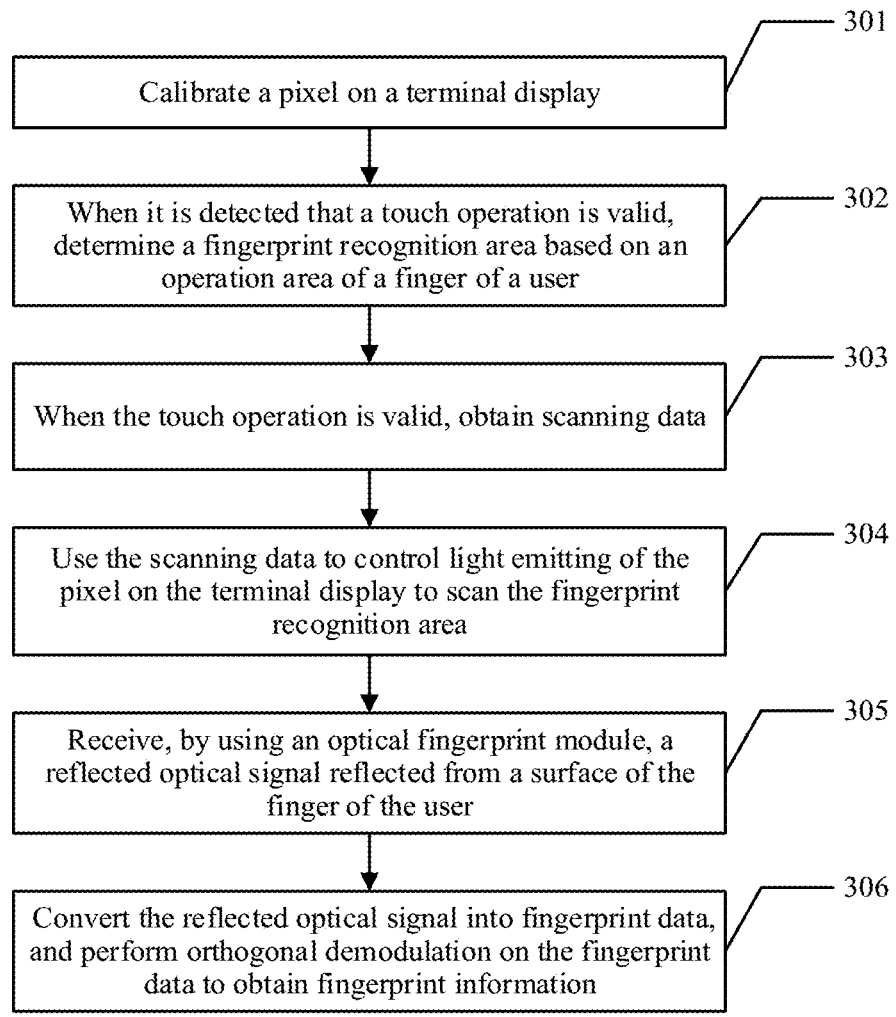
FIG. 3
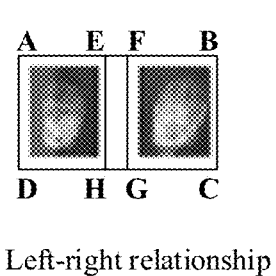
Left-right relationship
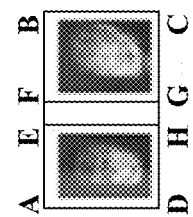
Up-down relationship
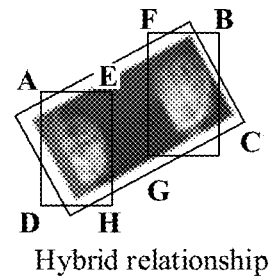
Hybrid relationship
FIG. 4

$$M0 = \begin{bmatrix} m000 & m010 & m020 & m030 \\ m100 & m110 & m120 & m130 \\ m200 & m210 & m220 & m230 \\ m300 & m310 & m320 & m330 \end{bmatrix} \quad M1 = \begin{bmatrix} m001 & m011 & m021 & m031 \\ m101 & m111 & m121 & m131 \\ m200 & m210 & m220 & m231 \\ m301 & m311 & m321 & m331 \end{bmatrix} \quad M2 = \begin{bmatrix} m002 & m012 & m022 & m032 \\ m102 & m112 & m122 & m132 \\ m202 & m212 & m222 & m232 \\ m302 & m312 & m322 & m332 \end{bmatrix} \quad M3 = \begin{bmatrix} m003 & m013 & m023 & m033 \\ m103 & m113 & m123 & m133 \\ m203 & m213 & m223 & m233 \\ m303 & m313 & m323 & m333 \end{bmatrix}$$

Two-dimensional matrix M0[i, j]  Two-dimensional matrix M1[i, j]  Two-dimensional matrix M2[i, j]  Two-dimensional matrix M3[i, j]

FINGERPRINT INFORMATION OBTAINING METHOD AND FINGERPRINT RECOGNITION APPARATUS

CROSS-REFERENCE TO RELATED APPLICATIONS

This application is a continuation of International Application No. PCT/CN2018/110776, filed on Oct. 18, 2018, which claims priority to Chinese Patent Application No. 201810654363.5, filed on Jun. 22, 2018 and Chinese Patent Application No. 201710996402.5, filed on Oct. 20, 2017, all of which are hereby incorporated by reference in their entireties.

TECHNICAL FIELD

This application relates to the field of optical fingerprint recognition technologies, and in particular, to a fingerprint information obtaining method and a fingerprint recognition apparatus for optical fingerprint recognition.

BACKGROUND

Fingerprint recognition technologies relate to various technical research fields, and are widely applied to work and life. Currently, the fingerprint recognition technologies mainly include a capacitive fingerprint recognition technology, an ultrasonic fingerprint recognition technology, and an optical fingerprint recognition technology. Currently, the optical fingerprint recognition technology is used in most of terminal devices including a smartphone, a tablet computer, and a notebook computer.

In the optical fingerprint recognition technology, a photoelectric detector (photo detector, PD) or the like is integrated in a terminal display and is disposed inside the display, or is disposed under the display. Self-emitting light of a pixel on the terminal display is used as a light source to irradiate a finger, and the PD receives an optical signal reflected by a surface of the finger, converts the optical signal into an electrical signal, and further processes the electrical signal to obtain fingerprint information.

Light of pixels interferes with each other, which is referred to as afterglow interference. In addition, the PD also receives ambient light. Strong ambient light also causes interference to an optical fingerprint, which is referred to as ambient light interference. Therefore, an interference signal exists in the optical signal received by the PD. Accuracy of the obtained fingerprint information is relatively low, affecting fingerprint recognition performance.

SUMMARY

In view of this, a first aspect of the embodiments of this application provides a fingerprint information obtaining method, including: first, if a start operation on a terminal screen is detected, obtaining a first vector set, where the first vector set includes A (A is greater than or equal to 2) data vectors that are mutually orthogonal or mutually quasi-orthogonal, and each data vector includes a plurality of data elements; then, sequentially using the data elements in each of the data vectors to control light emitting of minimum pixel units in a fingerprint recognition area until controlling light emitting of all the minimum pixel units in the fingerprint recognition area is completed, to obtain a second vector set corresponding to the fingerprint area, where the second vector set carries fingerprint information; and finally, demodulating the second vector set by using the first vector set to obtain all fingerprint information in the fingerprint recognition area.

That the vectors are mutually orthogonal means that the following two conditions are met: (1) For two different vectors, an inner product of the two vectors is 0. (2) For any vector, an inner product of the vector itself is not 0. The two conditions may be represented by using the following formulas:

$$W_i * W_j = 0, \; i \neq j; \text{ and} \tag{1}$$

$$W_i * W_j = A, \; i = j; \text{ where} \tag{2}$$

W represents a vector, and subscripts i and j are used to indicate serial numbers of vectors.

That the vectors are mutually quasi-orthogonal means that on a basis of meeting the foregoing condition (2), the inner product of the two vectors in condition (1) is a very small number (which may be a positive number or a negative number) close to 0, such as 0.1 or −0.05. Persons skilled in the art know that a specific value may be designed according to a requirement on precision. Details are not described herein.

Constructing vectors that are mutually orthogonal or mutually quasi-orthogonal falls within the prior art. For example, simply, some elements of vectors may be set to a specific quantity of 0s to implement orthogonality. For example, it is assumed that there are three vectors, one vector may be {1, 0, 0, 0}, another is {0, 1, 0, 0}, and the third is {0, 0, 0, 1}. In addition, more complex vectors that are mutually orthogonal may be constructed by using other known or unknown algorithms such as a simulated annealing algorithm proposed by Patric Ostergard.

It can be learned from the foregoing technical solution that this technical solution of this application has the following advantages: In this application, A groups of data vectors that are mutually orthogonal and that are in the first vector set are used to control light emitting of all minimum pixels in the fingerprint recognition area, so as to obtain the second vector set that carries the fingerprint information in the fingerprint recognition area. Finally, the first vector set is used to demodulate the second vector set to obtain all the fingerprint information in the fingerprint recognition area. It may be understood that, because the data vectors are mutually orthogonal, in a process of using the data vectors to control light emitting of the minimum pixel units, mutual interference between emitting light of the minimum pixel units can be reduced. Therefore, the fingerprint information obtained through demodulation is more accurate, and accuracy of obtaining the fingerprint information is improved, thereby improving fingerprint recognition performance. It may be understood that characteristics of the data vectors that are mutually quasi-orthogonal are similar to those of the data vectors that are mutually orthogonal. Therefore, a similar effect can also be achieved, that is, mutual interference between emitting light of the minimum pixel units can also be reduced, thereby improving fingerprint recognition performance.

With reference to the first aspect of the embodiments of this application, in a first possible implementation of the first aspect of the embodiments of this application, the sequentially using the data elements in each of the data vectors to control light emitting of minimum pixel units in the fingerprint recognition area includes: (1) first using data elements with a same sequence number in all the data vectors, to control light emitting of the minimum pixel units in predetermined order; (2) further using data elements with another same sequence number in all the data vectors, to control light emitting of the minimum pixel units in the predetermined order; (3) repeatedly performing processes in (1) and (2) until data elements with a last same sequence number in all the data vectors are used to control light emitting of the minimum pixel units in the fingerprint recognition area; and (4) if controlling light emitting of all the minimum pixel units in the fingerprint recognition area is not completed, repeatedly performing processes in (1), (2), and (3) until completion.

In this implementation method, data elements with a same sequence number are separately used in turn in the predetermined order to control light emitting of the minimum pixel units. Even if a minimum pixel unit is lit up in the predetermined order, the minimum pixel unit emits light for a period of time after being lit up and then dies out. Therefore, when the minimum pixel units are lit up in the predetermined order, afterglow interference from a previously lit minimum pixel unit to a next lit minimum pixel unit may be reduced or even eliminated, thereby obtaining more accurate fingerprint data.

With reference to the first aspect of the embodiments of this application and the first possible implementation of the first aspect, in a second possible implementation of the first aspect of the embodiments of this application, the first vector set is constructed by using a three-dimensional matrix M[I, J, K], I, J, and K are sequentially dimensions of the three-dimensional matrix M[I, J, K] in X, Y, and Z directions, column vectors that are at different coordinate locations on X and Y planes in the three-dimensional matrix M[I, J, K] are mutually orthogonal, A is equal to a product of I and J, one of the data vectors is any column vector that is at a same coordinate location on the X and Y planes in the three-dimensional matrix M[I, J, K], and one of the data vectors includes K data elements.

In this implementation, the data vectors that are mutually orthogonal in the first vector set are constructed by using the three-dimensional matrix. In specific implementation, the three-dimensional matrix may be constructed by using the simulated annealing algorithm or the like. Because the data vectors need to be mutually orthogonal, more data vectors indicate greater construction difficulty of the data vectors. However, the construction difficulty can be effectively reduced by converting the data vectors into the three-dimensional matrix and constructing the data vectors by using a characteristic of the three-dimensional matrix. In addition, a complex construction algorithm, such as the foregoing simulated annealing algorithm, may be further implemented by using a computer. Therefore, a method for constructing the first vector set by using the three-dimensional matrix is relatively simple and convenient, and the construction can be quickly and accurately completed.

With reference to the first possible implementation of the first aspect of the embodiments of this application, in a third possible implementation of the first aspect of the embodiments of this application, one of the data vectors is corresponding to one or more minimum pixel units, and one of the minimum pixel units includes one or more pixels.

In this implementation, when one data vector is corresponding to a plurality of pixels, it is easy to understand that one data vector can be used to control light emitting of a plurality of pixels. This can shorten duration for controlling light emitting of the pixel, and the fingerprint information can be obtained more quickly, thereby improving fingerprint recognition performance.

With reference to the first aspect of the embodiments of this application, in a fourth possible implementation of the first aspect of the embodiments of this application, the second vector set includes the A fingerprint vectors, and the fingerprint vector includes fingerprint information collected in a light emitting process of the minimum pixel unit. The demodulating the second vector set by using the first vector set to obtain all fingerprint information in the fingerprint recognition area includes: performing a vector inner product operation by using a data vector and a fingerprint vector that are corresponding to a same minimum pixel unit, until vector inner product operations corresponding to all the minimum pixel units in the fingerprint recognition area are completed, to obtain all the fingerprint information in the fingerprint recognition area.

In this implementation, because there is a correspondence among a fingerprint vector, a minimum pixel unit, and a data vector, there is no doubt that fingerprint information corresponding to a minimum pixel unit can be obtained only by performing a vector inner product operation on a data vector and a fingerprint vector that are corresponding to the same minimum pixel unit. The fingerprint information in the fingerprint recognition area is obtained by using the vector inner product operation method. The implementation method is simple and has relatively high accuracy.

With reference to the first aspect of the embodiments of this application and the fourth possible implementation of the first aspect, in a fifth possible implementation of the first aspect of the embodiments of this application, before the sequentially using the data elements in each of the data vectors to control light emitting of minimum pixel units in the fingerprint recognition area, the method further includes: converting the data element in each of the data vectors into standardized display data, where the standardized display data is used to control light emitting of the minimum pixel units.

In this implementation, because the data vectors are orthogonal, the data element in the orthogonal vector is specific. After the data element is converted into the standardized display data, light emitting of the minimum pixel unit, light emitting intensity, and the like can be better controlled, so that a correspondence is established between the data element and the light emitting intensity, thereby avoiding an adverse effect of a non-standard data element in a light emitting modulation process, and further ensuring accuracy of the fingerprint information.

With reference to the fifth possible implementation of the first aspect of the embodiments of this application, in a sixth possible implementation of the first aspect of the embodiments of this application, the standardized display data includes gray-scale data, and the converting the data element in each of the data vectors into standardized display data includes: converting the data element in each of the data vectors into the gray-scale data according to Formula 1 or Formula 2, where Formula 1 is $y=(2^n-1)*((m[i, j, k])-min)/(max-min)$; Formula 2 is $y=(2^n-1)*\sin\{0.5*\pi*((m[i, j, k])-min)/(max-min)\}$; and in Formula 1 and Formula 2, y is the gray-scale data, n is a quantity of bits of the gray-scale data, m[i, j, k] is any data element in the first vector set, $i\in[1, I]$, $j\in[1, J]$, $k\in[1, K]$, max is a maximum element value in the first vector set, and min is a minimum element value in the first vector set.

The gray-scale data is common standardized display data. Converting the data element into the gray-scale data by using Formula 1 or Formula 2 can effectively control light emitting of the minimum pixel unit, thereby implementing light emitting modulation on a pixel unit.

With reference to the first aspect of the embodiments of this application, in a seventh possible implementation of the first aspect of the embodiments of this application, the fingerprint recognition area includes N fingerprint recognition sub-areas, N is an integer greater than 1, the start operation is a touch operation, and the method further includes: if the touch operation on the terminal display is detected, determining the fingerprint recognition area based on an operation area corresponding to the touch operation, and dividing the fingerprint recognition area into the N fingerprint recognition sub-areas, where the operation area is within an area range of the fingerprint recognition area.

In this implementation, the fingerprint recognition area may be divided into a plurality of fingerprint recognition sub-areas according to an actual requirement, and the plurality of fingerprint recognition sub-areas are scanned simultaneously, so as to improve working efficiency.

With reference to the fourth possible implementation of the first aspect of the embodiments of this application, in an eighth possible implementation of the first aspect of the embodiments of this application, after the sequentially using the data elements in each of the data vectors to control light emitting of minimum pixel units in a fingerprint recognition area, the method further includes:

sensing, by using an optical sensor component, emitted light reflected by a finger of a user and converting the emitted light to obtain a fingerprint vector corresponding to a minimum pixel.

In this implementation, the optical sensor component includes a PD array. Optical-to-electrical conversion is performed on the reflected light by using the optical sensor component. Because a photosensitive characteristic of the PD array is good, the PD array can obtain accurate fingerprint data through conversion, thereby improving fingerprint recognition performance.

With reference to the eighth possible implementation of the first aspect of the embodiments of this application, in a ninth possible implementation of the first aspect of the embodiments of this application, before the sequentially using the data elements in each of the data vectors to control light emitting of minimum pixel units in a fingerprint recognition area, the method further includes:

calibrating the minimum pixel unit and the PD array to obtain a correspondence between the minimum pixel unit and the PD array.

In this implementation, before light emitting modulation, the correspondence between the minimum pixel unit and the PD array is established through calibration, so that in an orthogonal demodulation process, a PD corresponding to the minimum pixel unit can be obtained based on the correspondence, so as to obtain accurate fingerprint data. The minimum pixel unit includes a pixel, and the correspondence between the minimum pixel unit and the PD array may be as follows: A plurality of pixels are corresponding to a plurality of PDs, one pixel is corresponding to a plurality of PDs, or one pixel is corresponding to one PD.

A second aspect of the embodiments of this application provides a fingerprint recognition apparatus, including: an obtaining module, configured to: if a start operation on a terminal screen is detected, obtain a first vector set, where the first vector set includes A data vectors that are mutually orthogonal, each of the data vectors includes a plurality of data elements, and A is an integer greater than 1; a light emitting control module, configured to sequentially use the data elements in each of the data vectors to control light emitting of minimum pixel units in a fingerprint recognition area until controlling light emitting of all the minimum pixel units in the fingerprint recognition area is completed, to obtain a second vector set corresponding to the fingerprint recognition area, where the second vector set carries fingerprint information; and a demodulation module, configured to demodulate the second vector set by using the first vector set to obtain all fingerprint information in the fingerprint recognition area.

With reference to the second aspect of the embodiments of this application, in a first possible implementation of the second aspect of the embodiments of this application, the light emitting control module is specifically configured to perform the following operations: (1) first using data elements with a same sequence number in all the data vectors, to control light emitting of the minimum pixel units in predetermined order; (2) further using data elements with a same sequence number in all the data vectors, to control light emitting of another minimum pixel unit in the predetermined order; (3) repeatedly performing processes in (1) and (2) until data elements with a last same sequence number in all the data vectors are used to control light emitting of the minimum pixel units in the fingerprint recognition area; and (4) if the controlling light emitting of all the minimum pixel units in the fingerprint recognition area is not completed, repeatedly performing processes in (1), (2), and (3) until completion.

With reference to the second aspect of the embodiments of this application and the first possible implementation of the second aspect, in a second possible implementation of the second aspect of the embodiments of this application, the first vector set is constructed by using a three-dimensional matrix $M[I, J, K]$, I, J, and K are sequentially dimensions of the three-dimensional matrix $M[I, J, K]$ in X, Y, and Z directions, column vectors that are at different coordinate locations on X and Y planes in the three-dimensional matrix $M[I, J, K]$ are mutually orthogonal, A is equal to a product of I and J, one of the data vectors is any column vector that is at a same coordinate location on the X and Y planes in the three-dimensional matrix $M[I, J, K]$, and one of the data vectors includes K data elements.

With reference to the first possible implementation of the second aspect of the embodiments of this application, in a third possible implementation of the second aspect of the embodiments of this application, one of the data vectors is corresponding to one or more minimum pixel units, and one of the minimum pixel units includes one or more pixels.

With reference to the second aspect of the embodiments of this application, in a fourth possible implementation of the second aspect of the embodiments of this application, the second vector set includes the A fingerprint vectors, and the fingerprint vector includes fingerprint information collected in a light emitting process of the minimum pixel unit; and the demodulation module is specifically configured to perform a vector inner product operation by using a data vector and a fingerprint vector that are corresponding to a same minimum pixel unit, until vector inner product operations corresponding to all the minimum pixel units in the fingerprint recognition area are completed, to obtain all the fingerprint information in the fingerprint recognition area.

With reference to the second aspect of the embodiments of this application and the fourth possible implementation of the second aspect, in a fifth possible implementation of the second aspect of the embodiments of this application, the fingerprint recognition apparatus further includes a conversion module, configured to convert the data element in each of the data vectors into standardized display data, where the standardized display data is used to control light emitting of the minimum pixel units.

With reference to the fifth possible implementation of the second aspect of the embodiments of this application, in a sixth possible implementation of the second aspect of the embodiments of this application, the standardized display data includes gray-scale data, and the conversion module is specifically configured to:

convert the data element in each of the data vectors into the gray-scale data according to Formula 1 or Formula 2, where Formula 1 is $y=(2^n-1)*((m[i, j, k])-\min)/(\max-\min)$; Formula 2 is $y=(2^n-1)*\sin\{0.5*\pi*((m[i, j, k])-\min)/(\max-\min)\}$; and in Formula 1 and Formula 2, y is the gray-scale data, n is a quantity of bits of the gray-scale data, $m[i, j, k]$ is any data element in the first vector set, $i \in [1, I]$, $j \in [1, J]$, $k \in [1, K]$, max is a maximum element value in the first vector set, and min is a minimum element value in the first vector set.

With reference to the second aspect of the embodiments of this application, in a seventh possible implementation of the second aspect of the embodiments of this application, the fingerprint recognition area includes N fingerprint recognition sub-areas, N is an integer greater than 1, the start operation is a touch operation, and the fingerprint recognition apparatus further includes a determining module, configured to: if the touch operation on the terminal display is detected, determine the fingerprint recognition area based on an operation area corresponding to the touch operation, and divide the fingerprint recognition area into the N fingerprint recognition sub-areas, where the operation area is within an area range of the fingerprint recognition area.

For another implementation of the second aspect, refer to the related implementation of the first aspect. Details are not described herein again. In addition, beneficial effects of the second aspect and the implementations of the second aspect are similar to beneficial effects of the first aspect. For details, refer to related descriptions of the first aspect. Details are not described herein again.

A third aspect of the embodiments of this application provides a fingerprint recognition apparatus, including: a memory and a processor. The memory is configured to store an operation instruction; and the processor is configured to invoke the operation instruction to perform the fingerprint information obtaining method according to any one of the first aspect.

A fourth aspect of the embodiments of this application provides a computer storage medium, and the computer storage medium stores an operation instruction. When the operation instruction is run on a computer, the computer is enabled to perform the fingerprint information obtaining method according to any one of the first aspect.

A fifth aspect of the embodiments of this application provides a computer program product, and when the computer program product is run on a computer, the computer is enabled to perform the fingerprint information obtaining method according to any one of the first aspect.

For beneficial effects of the third aspect to the fifth aspect, refer to related descriptions in the first aspect. Details are not described herein again.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and persons of ordinary skill in the art may still derive other drawings from these accompanying drawings without creative efforts.

FIG. 3 is a schematic diagram of an embodiment of another fingerprint information obtaining method according to an embodiment of this application;

FIG. 4 is a schematic diagram of division of a fingerprint recognition area according to an embodiment of this application;

FIG. 13 is a schematic diagram of a three-dimensional four-order matrix according to an embodiment of this application;

FIG. 14 (b) is a schematic diagram of fingerprint scanning of another two-dimensional matrix according to an embodiment of this application;

FIG. 14 (c) is a schematic diagram of fingerprint scanning of another two-dimensional matrix according to an embodiment of this application;

FIG. 14 (d) is a schematic diagram of fingerprint scanning of another two-dimensional matrix according to an embodiment of this application;

DETAILED DESCRIPTION OF EMBODIMENTS

This application provides a fingerprint information obtaining method, to improve accuracy of obtaining fingerprint information, thereby improving fingerprint recognition performance.

The following clearly describes the technical solutions in this application with reference to the accompanying drawings in this application. Apparently, the described embodiments are merely a part of embodiments rather than all of the embodiments in this application. The fingerprint information obtaining method in this application is applicable to terminal devices such as a smartphone, a tablet computer, a notebook computer, and a vehicle-mounted device, and is not merely limited to the foregoing terminal devices.

Figure 1:
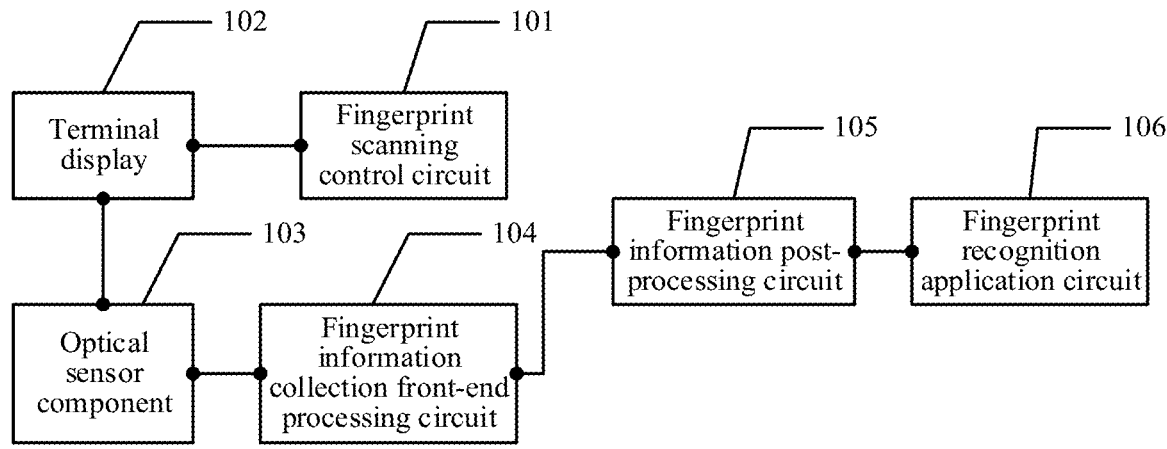
FIG. 1 is a schematic diagram of a framework of an optical fingerprint recognition system according to an embodiment of this application.

FIG. 1 is a schematic diagram of a system framework of an optical fingerprint recognition system according to an embodiment of this application. As shown in FIG. 1, the optical fingerprint recognition system includes the following six components: a fingerprint scanning control circuit 101, a terminal display 102, an optical sensor component 103, a fingerprint information collection front-end processing circuit 104, a fingerprint information post-processing circuit 105, and a fingerprint recognition application circuit 106. The terminal display 102 may be a liquid crystal display (liquid crystal display, LCD for short), may be an organic light emitting diode (organic light emitting diode, OLED for short) display, a quantum dot light emitting diode (quantum dot light emitting Diode, QLED for short) display, or a micro light emitting diode (micro light emitting diodes, MLED) display.

The fingerprint scanning control circuit 101 is configured to control fingerprint scanning and driver logic.

The optical sensor component 103 is mainly configured to sense an optical signal and convert the optical signal into an electrical signal, for example, may be an array formed by the foregoing PD (PD array for short below).

The fingerprint information collection front-end processing circuit 104 is configured to process the electrical signal collected by the optical sensor component 103, including but not limited to various types of processing such as filtering, noise reduction, ADC conversion, and protocol interface processing.

The fingerprint information post-processing circuit 105 is configured to perform calculation and analysis on data processed by the fingerprint information collection front-end processing circuit 104, to obtain fingerprint information.

The fingerprint recognition application circuit 106 is configured to perform an operation such as user identity information authentication by using the fingerprint information that is output by the fingerprint information post-processing circuit 105.

The foregoing circuits may be implemented based on different implementation hardware. For example, in an example, any one or more of the three circuits: the fingerprint scanning control circuit 101, the fingerprint information post-processing circuit 105, and the fingerprint recognition application circuit 106 may be implemented based on a general purpose processor (such as a CPU) (that is, the CPU usually reads an instruction stored in a memory to implement functions of the circuits), and the CPU and another processing circuit may be packaged together into one chip.

In another example, any one or more of the three circuits: the fingerprint scanning control circuit 101, the fingerprint information collection front-end processing circuit 104, and the fingerprint information post-processing circuit 105 may be implemented based on an integrated circuit. For example, functions of the circuits are implemented by using an ASIC, an FPGA, or the like. In addition, for better integration, the circuits may be packaged into one chip. Certainly, it is nonrestrictive that any one or more of the circuits are packaged into one chip separately.

In another example, the fingerprint recognition application circuit 106 is implemented based on a CPU. The optical sensor component 103 is a PD array. The fingerprint scanning control circuit 101, the fingerprint information collection front-end processing circuit 104, and the fingerprint information post-processing circuit 105 each are implemented by using an integrated circuit and are packaged into a same chip.

In the fingerprint information obtaining method in this application, light emitting of all minimum pixel units in a fingerprint recognition area is controlled by using A groups of data vectors that are mutually orthogonal in a first vector set, to obtain a second vector set that carries fingerprint information in the fingerprint recognition area. Finally, the second vector set is demodulated by using the first vector set, to obtain all fingerprint information in the fingerprint recognition area. It can be understood that because the data vectors are mutually orthogonal, in a process of controlling light emitting of the minimum pixel units by using the data vectors, mutual interference between emitting light of the minimum pixel units can be reduced, so that the fingerprint information obtained through demodulation is more accurate, accuracy of obtaining the fingerprint information is improved, and fingerprint recognition performance is improved.

For ease of understanding the fingerprint information obtaining method in this application, the fingerprint information obtaining method in this application is described in detail below with reference to the accompanying drawings and specific embodiments.

Figure 2:
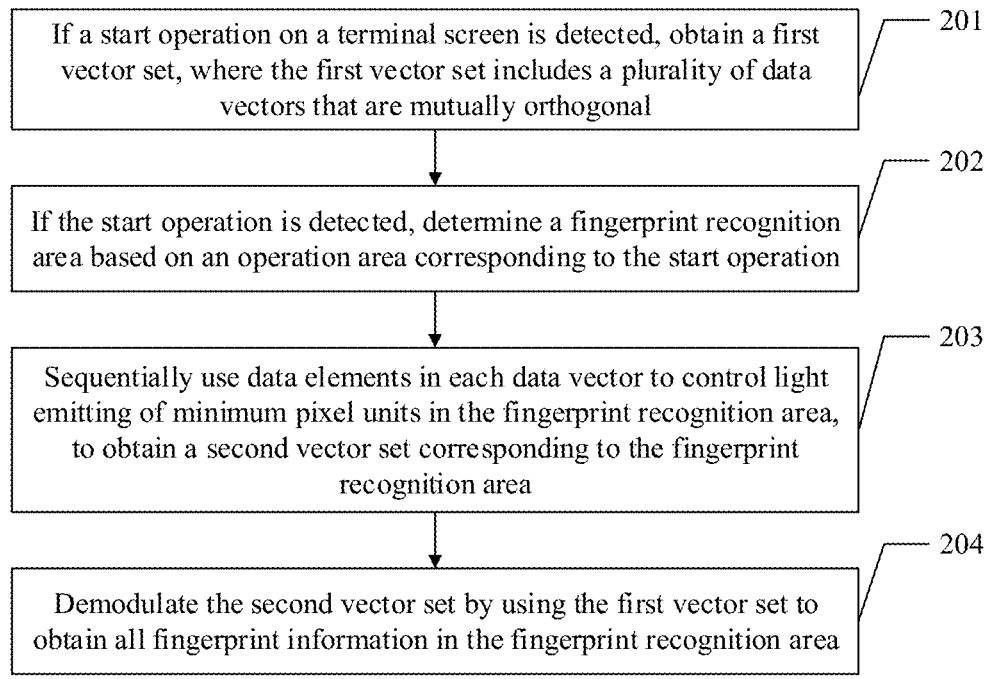
FIG. 2 is a schematic diagram of an embodiment of a fingerprint information obtaining method according to an embodiment of this application.

FIG. 2 is a schematic diagram of an embodiment of a fingerprint information obtaining method according to an embodiment of this application. As shown in FIG. 2, the fingerprint information obtaining method includes the following steps.

201. If a start operation on a terminal screen is detected, obtain a first vector set, where the first vector set includes a plurality of data vectors that are mutually orthogonal or mutually quasi-orthogonal.

For example, the first vector set includes A data vectors that are mutually orthogonal, A is an integer greater than or equal to 2, and each of the data vectors includes a plurality of data elements. The start operation is an operation for triggering a fingerprint recognition apparatus to start to perform the fingerprint information obtaining method. For example, a mobile phone is used as an example. In a screen-locked state of the mobile phone, the start operation is a touch operation performed by a finger of a user on a fingerprint recognition area, or a touch operation performed by a finger of a user on any area of a screen of the mobile phone. A specific representation form of the touch operation is not limited in this application, provided that a technical effect similar to that of the touch operation can be achieved.

In a specific implementation of obtaining the first vector set, all data elements in the first vector set may be read from physical storage space, such as a memory, corresponding to the first vector set by the fingerprint scanning control circuit 101 shown in FIG. 1, or all the data may be read from a corresponding memory by using an integrated circuit or a chip similar to the fingerprint scanning control circuit 101.

In an example, the first vector set and the corresponding data elements may be constructed by using a three-dimensional matrix M[I, J, K]. I, J, and K are sequentially dimensions of the three-dimensional matrix M[I, J, K] in X, Y, and Z directions, and I, J, and K are integers greater than or equal to 1. Each matrix element is represented by m[i, j, k] (or mijk, for example, m011), where $i \in [1, I]$, $j \in [1, J]$, and $k \in [1, K]$. It should be noted that, in the three-dimensional matrix M[I, J, K], a column vector that is at a same coordinate location in any one of the X direction (namely, on Y and Z planes), the Y direction (namely, on X and Z planes), or the Z direction (namely, on X and Y planes) may be used as a data vector. One data vector correspondingly includes a plurality of data elements, for example, I, J, or Z data elements.

For example, a column vector in the Z direction is used as a data vector. K matrix elements at a same coordinate location in the Z direction (namely, on the X and Y planes) of the three-dimensional matrix M[I, J, K] form one column vector, namely, a data vector, which is denoted as $W_{i,j}$. For example, a column vector $W_{1,1}$ corresponding to a coordinate (1, 1) is {m111, m112, . . . , m11K}. It may be understood that, if elements in the Z direction form one column vector in the foregoing method, there are (I*J) column vectors in total in the three-dimensional matrix M[I, J, K]. In this case, A=(I*J).

The foregoing (I*J) column vectors meet the following orthogonal conditions: 1. For any two column vectors, if coordinate locations corresponding to the two column vectors are different, an inner product of the two column vectors is 0. 2. For any column vector, an inner product of the column vector itself is not 0. Constructing a three-dimensional matrix that meets the foregoing requirements falls within the prior art, for example, may be implemented by using a simulated annealing algorithm proposed by Patric Ostergard. Certainly, this application also imposes no limitation on various other algorithms that can be implemented to construct the foregoing three-dimensional matrix.

As described above, there are (I*J) column vectors in total in the three-dimensional matrix M[I, J, K]. If each matrix element in the three-dimensional matrix that meets the orthogonal conditions is used as one data element, there are (I*J*K) data elements in total, and the (I*J*K) data elements are classified into (I*J) data vectors based on the column vector $W_{i,j}$, where each data vector includes K data elements.

202. If the start operation is detected, determine a fingerprint recognition area based on an operation area corresponding to the start operation.

Optionally, if the start operation is detected, the fingerprint recognition apparatus may further determine the fingerprint recognition area based on the operation area corresponding to the start operation. For other descriptions of the start operation, refer to the related descriptions of the start operation in step 201. Details are not described herein again. For a specific method for determining the fingerprint recognition area, refer to related descriptions in step 304 below. Details are not described herein.

It should be noted that the fingerprint recognition area may be further determined in a pre-specified manner. Specifically, a specific area on the terminal screen may be used as the fingerprint recognition area. For example, a mobile phone is used as an example. An area that is at a lower part of a screen of the mobile phone and that is most conveniently touched by a user is used as the fingerprint recognition area. In addition, the user is notified of an area range of the specified fingerprint recognition area, to ensure that the user places a finger in the specified fingerprint area in an application scenario in which a fingerprint is required. Therefore, the mobile phone detects a touch operation in the specified area without needing to determine the fingerprint recognition area based on an operation area of the touch operation after the touch operation. In addition, to better ensure user experience, in a fingerprint application scenario in which fingerprint information needs to be obtained, when the user places the finger in an area of the mobile phone screen other than the specified fingerprint recognition area, the mobile phone may send prompt information to prompt the user to place the finger in the specified fingerprint recognition area, and a prompt manner is not limited.

203. Sequentially use the data elements in each data vector to control light emitting of minimum pixel units in the fingerprint recognition area to obtain a second vector set corresponding to the fingerprint recognition area.

After obtaining the data elements in the first vector set and determining the fingerprint recognition area, the fingerprint recognition apparatus sequentially uses the data elements in each data vector to control light emitting of the minimum pixel units in the fingerprint recognition area, until controlling light emitting of all the minimum pixel units in the fingerprint recognition area is completed, so as to obtain the second vector set corresponding to the fingerprint recognition area, where the second vector set carries fingerprint information.

In an example, a specific process in which the fingerprint recognition apparatus sequentially uses the data elements in each data vector to control light emitting of the minimum pixel units in the fingerprint recognition area may include the following steps:

(1) First sequentially use data elements with a same sequence number in all the data vectors, to control light emitting of the minimum pixel units in predetermined order.

(2) Further sequentially use data elements with another same sequence number in all the data vectors, to control light emitting of the minimum pixel units in the predetermined order.

(3) Repeatedly perform processes in (1) and (2) until data elements with a last same sequence number in all the data vectors are used to control light emitting of the minimum pixel units in the fingerprint recognition area.

(4) If the controlling light emitting of all the minimum pixel units in the fingerprint recognition area is still not completed, repeatedly perform processes in (1), (2), and (3) until completion.

In the example shown in steps (1), (2), (3), and (4), "sequentially using the data elements with a same sequence number in all the data vectors" means using one piece of data in one data vector, then using data with a same sequence number in another data vector, and so on. For example, first the first piece of data in the first data vector is used, then the first piece of data in the second data vector is used, then the first piece of data in the third data vector is used, and so on, until the first piece of data in all the data vectors is used. Next, the second piece of data in the first data vector may be used, the second piece of data in the second data vector may be used, and so on. It should be noted that order of data, in all the data vectors, used each time is not limited. For example, for the first time, the second piece of data in all the data vectors may be used, and for the second time, the fifth piece of data in all the data vectors may be used.

The "predetermined order" is predetermined order for lighting up the minimum pixel units. For example, for a rectangular region, the predetermined order may be order from left to right, from top to bottom, from right to left, or from top to bottom. Alternatively, other order may be used. In addition, if an area of the fingerprint recognition area is relatively large, when scanning cannot be completed at a time by using data in the all data vectors, scanning processes in (1), (2), and (3) may be repeatedly performed, that is, a process of lightning up minimum pixel units in a scanning area is repeatedly performed for one or more times by further using the data, until controlling light emitting of all the minimum pixel units in the fingerprint recognition area is completed.

In another implementation, one data vector may be corresponding to one minimum pixel unit, or one data vector may be corresponding to two or more minimum pixel units. In addition, in the foregoing two correspondences, each minimum pixel unit may include one pixel or two or more pixels.

Specific implementation of the controlling light emitting may be implemented by the fingerprint scanning control circuit 101 in FIG. 1, or may be implemented by an integrated circuit or a chip similar to the fingerprint scanning control circuit 101. After light emitting of the minimum pixel units in the fingerprint recognition area is controlled, the optical sensor component 103 (including a PD array) in FIG. 1 senses reflected light, converts the reflected light into an electrical signal, and outputs the electrical signal to the fingerprint information front-end collection circuit 104. The fingerprint information front-end collection circuit performs filtering and noise reduction processing on an optical signal collected by the PD array, to obtain corresponding fingerprint data, and saves the fingerprint data in a form of a fingerprint vector, namely, the second vector set.

Optionally, before the sequentially using the data elements in each data vector to control light emitting of the minimum pixel units in the fingerprint recognition area, the obtaining method further includes the following: The fingerprint recognition apparatus converts the data element in each data vector into standardized display data, where the standardized display data is used to control light emitting of the minimum pixel units.

The display data herein is data that is within a specific range and that is used to control a pixel of a display to emit light of different intensity. Specifically, each display (which is specifically completed by a driver of the display) controls, based on input data (namely, "the display data") within a specific range, a pixel of the display to emit light of different intensity. Therefore, to adapt to "the display data" of the display, in this application, the data element in the data vector may be converted (mapped) into the display data. In addition, it may be understood that, in order that the data element in the data vector can be corresponding to different display data, the data element in the data vector needs to be mapped to an interval range of the display data by ratio, and this process may be referred to as a standardization process. For example, assuming that the range of the display data is 1-10 and that a range of scanning data is 1-100, 1-10 of the scanning data may be converted into 1 of the display data, 11-20 of the scanning data is converted into 2 of the display data, 21-30 of the scanning data is converted into 3 of the display data, . . . , and so on.

In an example of the foregoing data conversion, the standardized data may be gray-scale data. The fingerprint recognition apparatus converts the data element in each data vector into the gray-scale data. For a specific conversion manner, refer to specific descriptions about conversion of the gray-scale data in step 304 below. Details are not described herein.

In a specific implementation, converting the data element in the data vector into the standardized display data may be implemented by the fingerprint scanning control circuit 101 in FIG. 1, or may be implemented by an integrated circuit, a chip, or the like having a conversion function similar to that of the fingerprint scanning control circuit 101.

204. Demodulate the second vector set by using the first vector set to obtain all fingerprint information in the fingerprint recognition area.

In an example, the second vector set includes A fingerprint vectors. It may be understood that a quantity of fingerprint vectors is the same as a quantity of data vectors, and the fingerprint vector includes fingerprint information collected in the light emitting process of the minimum pixel unit. In this case, the demodulating the second vector set by using the first vector set may be performing a vector inner product operation by using a data vector and a fingerprint vector that are corresponding to a same minimum pixel unit, until vector inner product operations corresponding to all the minimum pixel units in the fingerprint recognition area are completed. Finally, all the fingerprint information in the fingerprint recognition area is obtained.

For example, based on the data vector $W_{i,j}$ in step 201, after the data elements in each data vector $W_{i,j}$, are sequentially used to control light emitting of all the minimum pixel units in the fingerprint region, a fingerprint vector obtained is denoted as $V_{i,j}$. The data vector $W_{i,j}$ is in a one-to-one correspondence with the fingerprint vector $V_{i,j}$. In addition, an arrangement manner of fingerprint data in each fingerprint vector is the same as an arrangement manner of data elements in a data vector corresponding to the fingerprint vector.

The fingerprint information demodulation process may be specifically implemented by the fingerprint information post-processing circuit 105 in FIG. 1, or implemented by an integrated circuit or a chip having the demodulation function. A specific demodulation process of the fingerprint information post-processing circuit 105 may be as follows: The fingerprint information post-processing circuit 105 obtains fingerprint data processed by the fingerprint information front-end collection circuit 104, forms a corresponding fingerprint vector, and obtains a corresponding data vector from a memory. Finally, the fingerprint information post-processing circuit 105 performs a vector inner product operation based on the data vector and the fingerprint vector to obtain the fingerprint information.

In this embodiment, data vectors mutually orthogonal are used to perform light emitting modulation on a minimum pixel unit on a terminal display to obtain corresponding fingerprint data, namely, a fingerprint vector. Finally, the data vector and the fingerprint vector corresponding to the data vector are used to obtain accurate fingerprint information through demodulation, thereby improving fingerprint recognition performance. It may be understood that because the data vectors are mutually orthogonal, mutual interference between emitting light of minimum pixel units can be reduced in a light emitting modulation process. Therefore, in the fingerprint information obtaining method in this embodiment of this application, accuracy of obtaining the fingerprint information can be improved, and fingerprint recognition performance can be improved.

It can be learned from the description in FIG. 2 that the minimum pixel unit may be one or more pixels. The fingerprint information obtaining method in this embodiment of this application is described in detail below by using an example in which the minimum pixel unit is one pixel.

It should be noted that the scanning described below is relative to a user, that is, the scanning is scanning for a finger of the user. For a device, a scanning process in this embodiment of this application is a light emitting modulation process in which the scanning data is used to light up the pixel in the fingerprint recognition area. At the time of light emitting modulation, the emitting light of the pixel also completes scanning for the finger of the user in the light emitting modulation process. Therefore, the scanning described below may be equivalent to light emitting modulation of the pixel, and the scanning process is the light emitting modulation process of the pixel. Details are not described below.

FIG. 3 is a schematic diagram of an embodiment of another fingerprint information obtaining method according to an embodiment of this application. As shown in FIG. 3, the another fingerprint information obtaining method in this embodiment of this application includes the following steps.

301. Calibrate a pixel on a terminal display.

Before the terminal display is scanned, the pixel on the terminal display is calibrated to obtain a correspondence between a pixel location and a PD location. A calibration method may be as follows: The fingerprint scanning control circuit 101 is invoked to send a calibration instruction to drive lighting up of a pixel to irradiate a finger of a user, and record a location of the pixel. A PD array senses light reflected by the finger of the user, converts the light into an electrical signal, and finally stores, in a data cache area, data obtained after processing the signal. All data of the PD array in the data cache area is traversed to obtain data with a maximum value. A PD location corresponding to the data is recorded, so that a correspondence between the pixel location and the PD location is established based on the recorded pixel location and PD location, and is denoted as a (pixel, PD) pair and stored.

Likewise, based on the calibration method described above, a corresponding (pixel, PD) pair is established and stored for each pixel on the terminal display sequentially, to complete pixel calibration.

It should be noted that, in another embodiment, the correspondence between the pixel and the PD may not be a one-to-one correspondence. For example, the following relationships may exist:

(1) A Plurality of Pixels Corresponding to a Plurality of PDs

In this case, during scanning, one piece of data used during scanning is used to simultaneously light up a plurality of pixels. During receiving, data of a plurality of PDs is obtained, and processing such as addition or averaging may be performed on the data to obtain data that can reflect fingerprint information. In this process, it may be considered that the plurality of pixels are bound together and form one "large" pixel, and the plurality of PDs are bound together and form one "large" PD.

(2) One Pixel Corresponding to a Plurality of PDs

In this case, during scanning, one piece of data used during scanning is used to light up one pixel. During receiving, data of a plurality of PDs is obtained, and processing such as addition or averaging may be performed on the data to obtain data that can reflect fingerprint information.

(3) A Plurality of Pixels Corresponding to One PD

In this case, during scanning, one piece of data used during scanning is used to simultaneously light up a plurality of pixels. During receiving, a value of one corresponding PD is obtained.

302. When it is detected that a touch operation is valid, determine a fingerprint recognition area based on an operation area of a finger of a user.

Optionally, using a mobile terminal as an example, when the mobile terminal detects that the finger of the user touches a display, the mobile terminal determines, based on an actual scenario, whether the touch operation performed by the finger is valid. If the touch operation is valid, the mobile terminal starts fingerprint locating; otherwise, does not respond to the touch operation performed by the user. If fingerprint locating is started, the mobile terminal determines a coordinate location area in which the finger of the user is located as the operation area. Further, the mobile terminal determines the operation area as the fingerprint recognition area.

For example, in an application scenario of unlocking a screen by a fingerprint, when the user touches the display by using the finger in a screen-locked state of the mobile terminal, the mobile terminal may start fingerprint locating to perform fingerprint recognition, so as to unlock the screen after fingerprint recognition succeeds. When the user presses the screen by using the finger in an application scenario (for example, a game) in a screen-on state of the mobile terminal, the mobile terminal may not respond to the press operation of the user.

Further, optionally, there may be one or more fingerprint recognition areas. For example, in a multi-touch (that is, several fingers touch simultaneously) scenario, one fingerprint recognition sub-area may be divided for each touch point, and there is no contact between fingerprint recognition sub-areas. FIG. 4 is a schematic diagram of division of a fingerprint recognition area according to an embodiment of this application. A mobile phone screen is used as an example in FIG. 4. There are two touch points (fingerprints of two fingers) on the mobile phone screen, and location arrangements of the two touch points are not limited. For example, the arrangement may be of a left-right relationship, an up-down relationship, or a hybrid relationship. For the two touch points, two fingerprint recognition sub-areas AEHD and FBCG may be correspondingly generated. It may be understood that the two areas (needing to cover fingerprints that need to be detected) are larger than the touch points. However, the two areas do not need to be extremely large (excessively large areas introduce large areas unrelated to the fingerprint, and this is unnecessary). Usually, the two areas may be set to be one to three times the areas of the touch points, and some redundant areas are reserved around the touch points to prevent missing detection of some fingerprint data. In addition, for ease of subsequent processing, the two areas may be matrices.

303. When the touch operation is valid, obtain scanning data.

The scanning data is a data element in the first vector set in the embodiment corresponding to FIG. 2, and one data element is one piece of scanning data. Therefore, the scanning data may be a matrix element in the forgoing three-dimensional matrix M[I, J, K].

Figure 5:
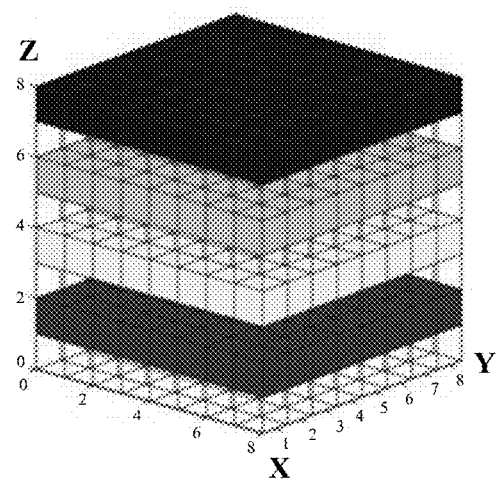
FIG. 5 is a schematic diagram of a three-dimensional matrix M[8, 8, 8] according to an embodiment of this application.

For example, FIG. 5 is a schematic diagram of a three-dimensional matrix M[8, 8, 8] according to an embodiment of this application. FIG. 5 shows an 8×8×8 three-dimensional matrix (that is, 1=8, J=8, and K=8). The three-dimensional matrix M[8, 8, 8] may be divided into eight two-dimensional matrices in a Z direction, and the two-dimensional matrices are respectively represented as: M1[I, J], M2[I, J], M3[I, J], M4[I, J], M5[I, J], M6[I, J], M7[I, J], and M8[I, J]. Matrix elements located at a same coordinate location (i, j) in the foregoing eight two-dimensional matrices form a column vector $W_{i,j}$. For example, a column vector $W_{1,1}$={m[1, 1, 1], m[1, 1, 2], m[1, 1, 3], m[1, 1, 4], m[1, 1, 5], m[1, 1, 6], m[1, 1, 7], and m[1, 1, 8]}, or $W_{i,j}$={m[1, 1, 8], m[1, 1, 7], m[1, 1, 6], m[1, 1, 5], m[1, 1, 4], m[1, 1, 3], m[1, 1, 2], and m[1, 1, 1]}, where m[1, 1, 1] to m[1, 1, 8] are respectively matrix elements at a coordinate (1, 1) in the two-dimensional matrices M1[i, j] to M8[i, j].

Likewise, 64 column vectors: $W_{1,2}$, $W_{1,3}$, $W_{1,4}$, $W_{1,5}$, $W_{2,1}$, $W_{2,2}$, . . . , and so on may be obtained in total. The 64 column vectors meet the following conditions: For a same column vector, an inner product of the column vector itself is 0, for example, $W_{1,1}*W_{1,1}=0$; and for any two different column vectors, an inner product of the two column vectors is not 0, for example, $W_{1,1}*W_{1,1}=a$ and $a\neq 0$. The three-dimensional matrix M[8, 8, 8] is sequentially constructed according to the foregoing orthogonal conditions, then each two-dimensional matrix of the three-dimensional matrix M[8, 8, 8] in the Z direction is used as one scanning pattern, and one matrix element is used as one piece of scanning data.

It should be noted that, a correspondence between the scanning data and the pixel is similar to the correspondence between the pixel and the PD. That is, one piece of scanning data may be corresponding to one pixel, one piece of scanning data may be corresponding to a plurality of pixels, or a plurality of pieces of scanning data may be corresponding to a plurality of pixels. For detailed descriptions, refer to related descriptions of the correspondence between the pixel and the PD in step 301. Details are not described herein again.

304. Use the scanning data to control light emitting of the pixel on the terminal display to scan the fingerprint recognition area.

After the scanning data is obtained in step 302, the scanning data is converted into gray-scale data. For example, the scanning data may be converted into the gray-scale data by using Formula 1 or Formula 2:

$$y=(2^n-1)*((m[i,j,k])-\min)/(\max-\min); \quad \text{Formula 1}$$

$$y=(2^n-1)*\sin\{0.5*\pi*((m[i,j,k])-\min)/(\max-\min)\}; \quad \text{Formula 2}$$

and in Formula 1 and Formula 2, y is the gray-scale data, n is a quantity of bits of the gray-scale data, m[i, j, k] is a matrix element at a coordinate location (i, j, k) of the three-dimensional matrix M[I, J, K], namely, any piece of scanning data, max is a maximum scanning data value in a scanning data group, and min is a minimum scanning data value in the scanning data group. Formula 1 and Formula 2 are merely used as an example for description, and do not set a limitation on a conversion manner. Another conversion manner having a same technical effect may be further used to convert the scanning data into the gray-scale data.

Figure 6:
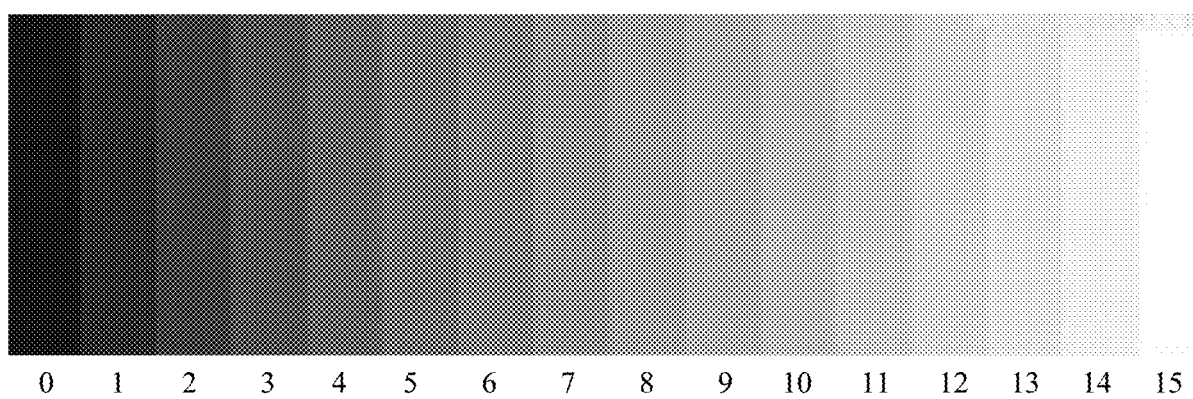
FIG. 6 is a schematic diagram of a 4-bit gray-scale level according to an embodiment of this application.
Figures 7, 8:
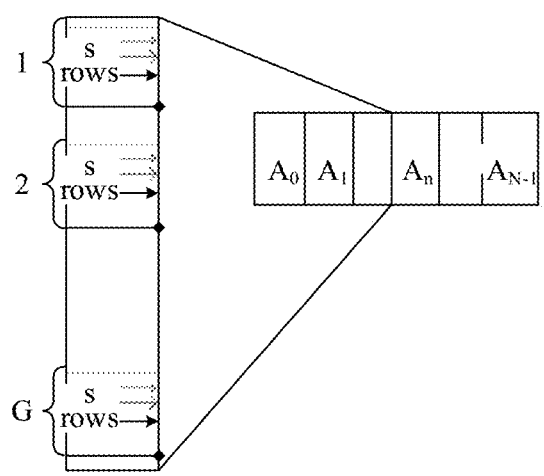
FIG. 7 is a schematic diagram of an 8-bit gray-scale level according to an embodiment of this application.
FIG. 8 is a schematic scanning diagram of a fingerprint recognition sub-area according to an embodiment of this application.

For example, the gray-scale data is used to control a gray-scale level (or referred to as a gray level) of the pixel on the display. Each pixel includes three sub-pixels: RGB, and a corresponding gray-scale level may be displayed by setting all the three sub-pixels to same gray-scale data. Usually, the gray-scale data has 4 bits or 8 bits. FIG. 6 is a schematic diagram of a 4-bit gray-scale level according to an embodiment of this application, and FIG. 7 is a schematic diagram of an 8-bit gray-scale level according to an embodiment of this application. As shown in FIG. 6, the gray-scale data has 4 bits, and therefore there are 16 gray-scale levels (from 0 to 15). When the gray-scale level is 0, brightness is the lowest, and when the gray-scale level is 15, brightness is the highest. If the gray-scale data has 8 bits, there are 256 gray-scale levels (from 0 to 255), and a relationship between the gray-scale level and brightness is shown in FIG. 7.

In an example of a scanning manner, for example, in the three-dimensional matrix M[8, 8, 8] shown in FIG. 5, as described above, each two-dimensional matrix of the three-dimensional matrix M[8, 8, 8] in the Z direction is used as one scanning pattern, and the matrix element is the scanning data. Each scanning pattern includes matrix elements with a same sequence number in 64 column vectors (namely, data vectors), that is, one scanning pattern includes 64 matrix elements, and the matrix elements are respectively matrix elements with the same sequence number in 64 column vectors.

The pixels in the fingerprint recognition area are separately scanned by sequentially using eight scanning patterns, and the following steps are performed during each scanning.

Step 1: Extract scanning data from one scanning pattern at an interval of s rows, where s≤I.

An extraction manner of the scanning data may be specifically extracting all the scanning data row by row, that is, all the scanning data is extracted row by row in sequence.

Step 2: Convert the scanning data into the gray-scale data to control light emitting of the pixel to scan the fingerprint recognition area.

Step 3: When all the data in the scanning pattern is extracted and step 2 is performed completely, move the scanning pattern in the fingerprint recognition area to continue scanning.

The foregoing scanning process is described by using an example. For example, one piece of scanning data is corresponding to one pixel. When a total quantity of pixels in the fingerprint recognition area is four times a quantity of pixels corresponding to the scanning pattern, only ¼ pixels in the fingerprint recognition area can be scanned by using the scanning pattern once. Therefore, pixels in the other ¾ fingerprint recognition area further need to be scanned by using the scanning pattern, to complete scanning of the fingerprint recognition area in this time. Therefore, scanning may be started by using the scanning pattern starting from a next pixel when previous scanning ends, so as to complete scanning of a next ¼ fingerprint recognition area. This process may be considered as moving of the scanning pattern in the fingerprint recognition area. It should be understood that, when the total quantity of pixels in the fingerprint recognition area is equal to the quantity of pixels corresponding to the scanning pattern, the entire fingerprint recognition area may be scanned by using the scanning pattern once, and it is unnecessary to move the scanning pattern in the fingerprint recognition area.

Step 4: After the entire fingerprint recognition area is scanned by the scanning pattern in a traverse manner, end the current scanning, and perform next scanning by using a next scanning pattern until scanning using the eight scanning patterns is completed.

In another example, before the using the scanning data to control light emitting of the pixel on the terminal display to scan the fingerprint recognition area, the obtaining method further includes the following: If the touch operation is valid, the fingerprint recognition apparatus may further determine the fingerprint recognition area based on the operation area corresponding to the touch operation, and divide the fingerprint recognition area into N fingerprint recognition sub-areas, where N is an integer greater than or equal to 2.

For example, when an area of the fingerprint recognition area is relatively large, to increase a scanning speed, the fingerprint recognition area may be divided into N fingerprint recognition sub-areas. In this way, the N fingerprint recognition sub-areas are scanned simultaneously, thereby improving fingerprint recognition efficiency. FIG. 8 is a schematic diagram of scanning of a fingerprint recognition sub-area according to an embodiment of this application. If the area of the fingerprint recognition area is N times an area of a pixel corresponding to one scanning pattern (that is, a quantity of pixels included in the fingerprint recognition area is N times a quantity of pixels corresponding to one scanning pattern), as shown on the right side in FIG. 8, the fingerprint recognition area is divided into N fingerprint recognition sub-areas A1 to An, where n∈[1, N]. As shown on the left side in FIG. 8, any fingerprint recognition sub-area in A1 to An is divided into G groups, and each group includes s rows of scanning data, where s is greater than or equal to 2, and is less than or equal to a value of a maximum quantity of rows in the scanning pattern.

As shown in FIG. 4, that is, when N is 2, the fingerprint recognition area is divided into two fingerprint recognition sub-areas AEHD and FBCG. For example, the AEHD sub-area is scanned. The AEHD sub-area is scanned by group and a specific process is as follows:

Step 5: Divide the AEHD sub-area into at least two groups, marked as G groups, where G is an integer greater than or equal to 2.

Step 6: For each group area in the G groups after the division, scan the AEHD sub-area by using a corresponding scanning pattern according to the scanning process described in step 1 to step 3.

Areas of the G groups may be scanned by sequentially performing the scanning process in step 1 to step 3, or areas of the G groups may be scanned by simultaneously performing the scanning process in step 1 to step 3.

Step 7: Continue to perform next scanning on the AEHD area by using another scanning pattern until scanning using all the scanning patterns is complete.

It should be noted that when the AEHD sub-area is scanned, the FBCG sub-area may be scanned simultaneously by using a similar method, or the AEHD area is first scanned, and then the FBCG area is scanned. This is not limited in this application.

It should be further noted that, the scanning data is extracted from the scanning pattern row by row, to generate row-by-row gray-scale data, and light up the pixels row by row. In addition to the row-by-row manner, scanning may be performed in the scanning pattern according to another predetermined rule, for example, the scanning data is extracted for scanning in a predetermined random manner or at an interval of predetermined quantity of scanning data.

In this embodiment, compared with the row-by-row manner, the random manner can reduce afterglow interference between adjacent pixels (that is, after each pixel is lit up, a light emitting state of the pixel is protected for a period of time; after a previous pixel is lit up, if a next adjacent pixel is instantly lit up while the previous pixel is not lit off, light of the previous pixel causes interference to the next pixel, which is referred to as afterglow interference), further reducing mutual interference between adjacent pixels.

305. Receive, by using an optical fingerprint module, a reflected optical signal reflected from a surface of the finger of the user.

Figure 9:
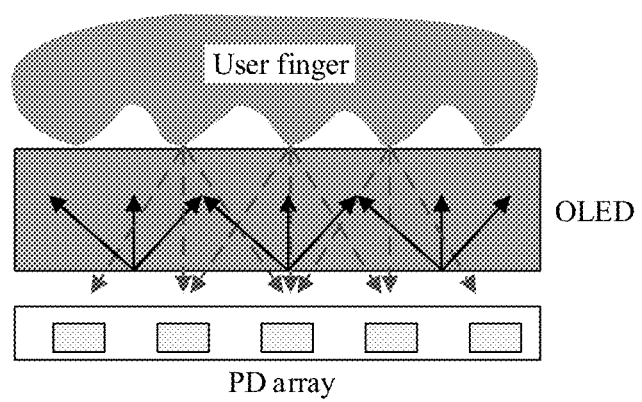
FIG. 9 is a schematic diagram of an optical path of a PD array according to an embodiment of this application.

In a specific implementation, the emitted optical signal reflected from the surface of the finger of the user is received by using a device such as the optical sensor component 103 shown in FIG. 1. FIG. 9 is a schematic diagram of an optical path of a PD array according to an embodiment of this application. As shown in FIG. 9, a PD array in the optical fingerprint component 103 receives the reflected optical signal reflected by the finger of the user on an OLED screen. As described in the calibration process in step 301, the (pixel, PD) pair used to represent the correspondence between the pixel location and the PD location has been established in the calibration process. Based on the location relationship recorded in the (pixel, PD) pair, when one of the pixels is lit up, a PD that receives the reflected optical signal may be determined.

It is easy to understand that, for a same pixel, a quantity of times that the pixel is lit up is consistent with a quantity of reflected optical signals received on a corresponding PD. That is, the quantity of times that the pixel is lit up is the same as a quantity of times that the PD corresponding to the pixel receives the reflected optical signal. The PD array may be replaced with another image sensor having a similar function. This is not limited in this application.

306. Convert the emitted optical signal into fingerprint data, and demodulate the fingerprint data to obtain fingerprint information.

As described in FIG. 1, the fingerprint information collection front-end processing circuit 104 performs processing such as amplification and filtering on the reflected optical signal received by the PD, to obtain the fingerprint data.

Because all pixels in the fingerprint recognition area are scanned for a plurality of times, correspondingly there are also a plurality of pieces of fingerprint data obtained by the PD. For example, eight pieces of fingerprint data obtained by scanning a same pixel for K times by using eight pieces of scanning data corresponding to the column vector $W_{1,1}$ in the three-dimensional matrix M[8, 8, 8] are successively: v111, v112, v113, v114, v115, v116, v117, and v118.

Based on a specific arrangement sequence, the K pieces of fingerprint data are arranged to obtain a column vector $V_{1,1}$, for example, $V_{1,1}$=(v111, v112, v113, v114, v115, v116, v117, v118) or $V_{1,1}$=(v118, v117, v116, v115, v114, v113, v112, v111).

Similar to the column vector $W_{i,j}$, fingerprint data obtained by scanning a scanning data group is represented by using the column vector $V_{i,j}$, where $V_{1,1}$ is a column vector corresponding to the fingerprint data obtained after the fingerprint recognition area is scanned by using $W_{1,1}$. It should be noted that, arrangement sequences of the fingerprint data in the column vector $V_{i,j}$ and the scanning data in the column vector $W_{i,j}$ are consistent.

For a same pixel, a vector inner product operation is performed on a column vector $V_{i,j}$ corresponding to fingerprint data of the pixel and a column vector $W_{i,j}$ corresponding to scanning data of the pixel, that is, $W_{i,j}*V_{i,j}=P_{i,j}$, where * is a vector inner product operator, $W_{i,j}$ is a column vector corresponding to scanning data of a pixel in a (pixel, PD) table, $V_{i,j}$ is a column vector formed by fingerprint data corresponding to a same pixel, and $P_{i,j}$ is a result obtained after an orthogonal demodulation operation, namely, the fingerprint information.

Finally, all fingerprint information $P_{i,j}$ obtained through the orthogonal demodulation operation is corresponding to a pixel, and a data table of (pixel, $P_{i,j}$) pairs is established, to obtain final fingerprint information, so that the fingerprint recognition application circuit 106 invokes the fingerprint information to perform an operation such as fingerprint verification.

In this embodiment, light emitting of the pixel on the terminal display is controlled by using the scanning data constructed by using the three-dimensional matrix having an orthogonal characteristic, to perform fingerprint scanning. It may be understood that, a finger surface has a reflective characteristic, and reflects the light of the pixel to form the reflected optical signal. The reflected optical signal carries the fingerprint information. Further, the reflected optical signal is converted into the fingerprint data, and orthogonal demodulation is performed on the fingerprint data to obtain the fingerprint information. The scanning data has the orthogonal characteristic, that is, orthogonal modulation is performed in the scanning process, and the fingerprint information is obtained after orthogonal demodulation is performed on the fingerprint data obtained after scanning. Through orthogonal modulation and orthogonal demodulation, interference from ambient light and interference between light of pixels can be reduced or even eliminated, and more accurate fingerprint information is obtained, thereby improving performance of optical fingerprint recognition.

Figure 10:
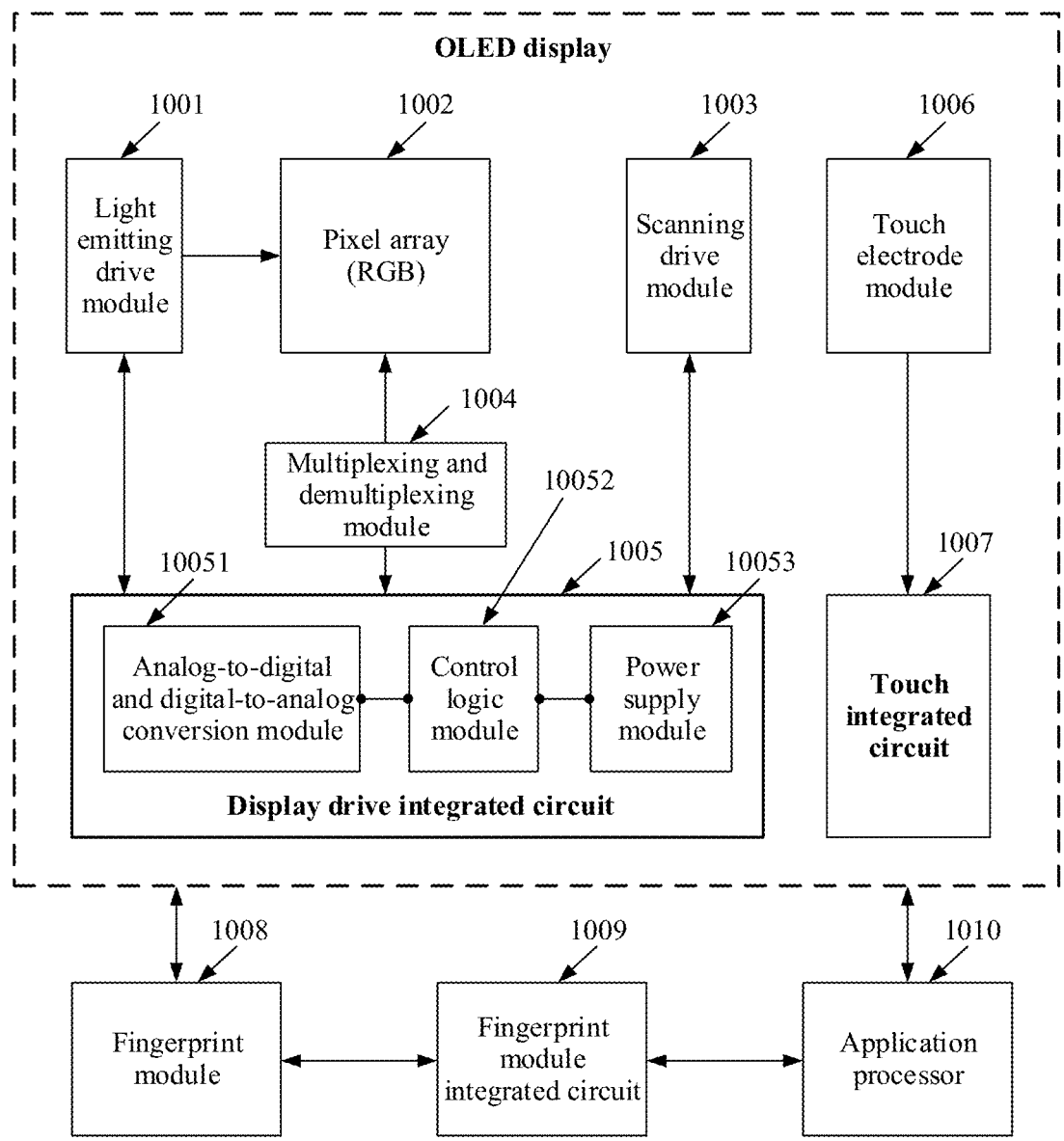
FIG. 10 is a structural diagram of hardware of a fingerprint recognition system of a smartphone according to an embodiment of this application.

Based on the foregoing embodiments, the fingerprint information obtaining method in this application is described in detail below with reference to a specific application scenario. FIG. 10 is a structural diagram of hardware of a fingerprint recognition system of a smartphone.

The fingerprint recognition system of the smartphone includes: a light emitting drive module 1001, a pixel array 1002, a scanning drive module 1003, a multiplexing and demultiplexing module 1004, a display drive integrated circuit 1005, a touch electrode module 1006, a touch integrated circuit 1007, a fingerprint module 1008, a fingerprint module integrated circuit 1009, and an application processor 1010.

The display drive integrated circuit 1005 includes three parts: an analog-to-digital and digital-to-analog conversion module 10051, a control logic module 10052, and a power supply module 10053. The light emitting drive module 1001, the pixel array 1002, the scanning drive module 1003, the multiplexing and demultiplexing module 1004, the display drive integrated circuit 1005, the touch electrode module 1006, and the touch integrated circuit 1007 are integrated in an OLED display of the smartphone. The fingerprint module 1008 and the fingerprint module integrated circuit 1009 are integrated below the OLED display.

The application processor 1010 provides a control interface for the display drive integrated circuit 1005, the touch integrated circuit 1007, and the fingerprint module integrated circuit 1009, and performs a fingerprint recognition algorithm and a higher-layer fingerprint recognition application.

The light emitting drive module 1001, the scanning drive module 1003, and the control logic module 10052 may implement the fingerprint scanning function and the drive logic control function of the fingerprint scanning control circuit 101 in FIG. 1.

The fingerprint module 1008 may specifically include the optical sensor component 103 (namely, the PD array), the fingerprint information collection front-end processing circuit 104, and the like in FIG. 1, to implement processing such as collection, filtering, and noise reduction on fingerprint data.

The fingerprint module integrated circuit 1009 may specifically include the fingerprint information post-processing circuit 105 in FIG. 1, to demodulate the fingerprint data to obtain corresponding fingerprint information.

Based on the foregoing embodiments, with reference to FIG. 10, this application provides a specific fingerprint information obtaining method. A specific method procedure of the method is shown in FIG. 11.

Figure 11:
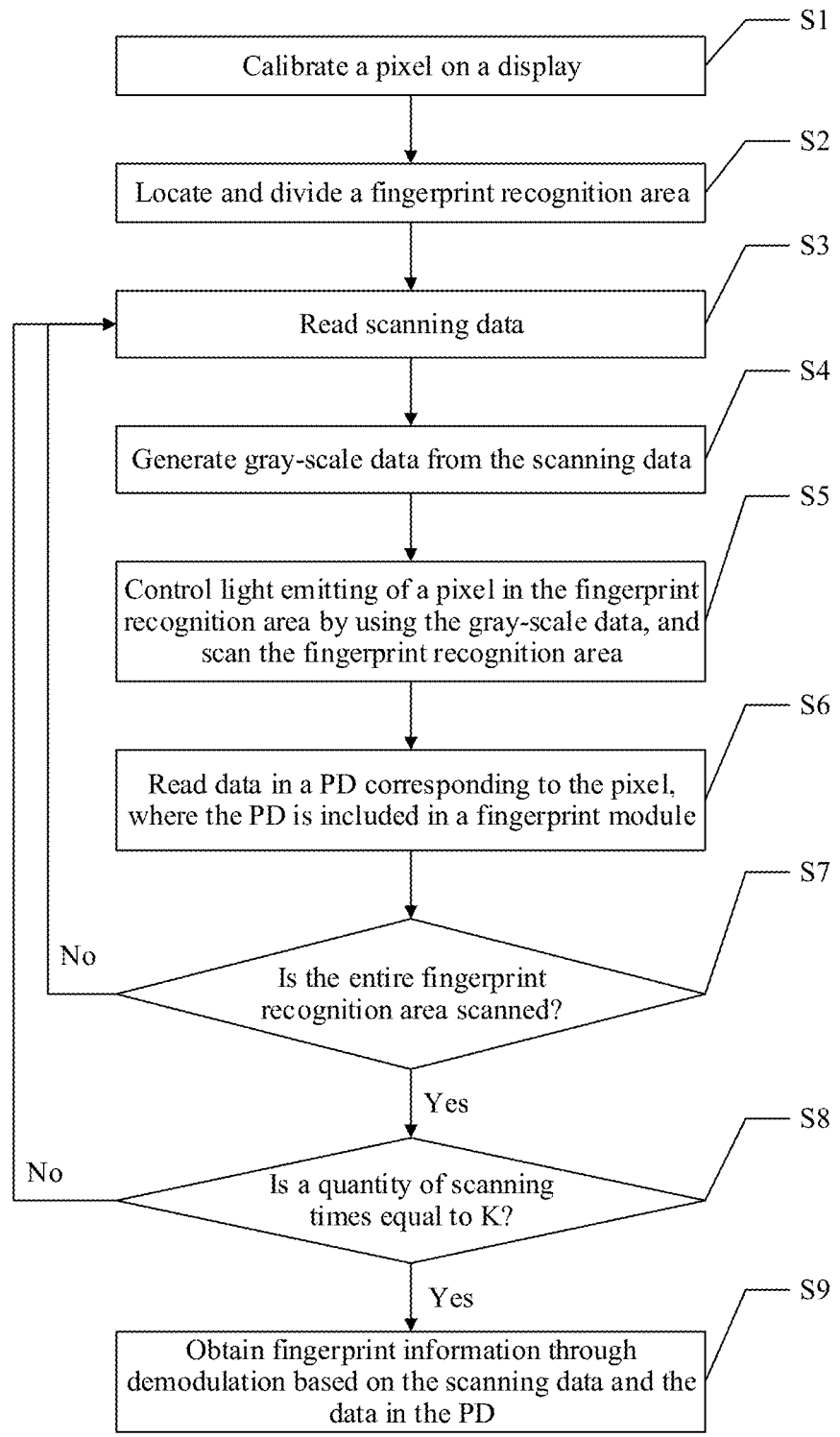
FIG. 11 is a schematic diagram of an embodiment of still another fingerprint information obtaining method according to an embodiment of this application.

FIG. 11 is a schematic diagram of an embodiment of a fingerprint information obtaining method according to an embodiment of this application. The method includes the following steps.

S1. Calibrate a pixel on a display.

A calibration method is similar to that in the description in step 301, and details are not described herein again.

S2. Locate and divide a fingerprint recognition area.

A specified area or the entire area of an OLED display is defined as the fingerprint recognition area. When a finger of a user touches the fingerprint recognition area, the touch operation is detected by a touch integrated circuit, and the touch integrated circuit reports a detection result to the AP 1010. The AP 1010 starts a locating and dividing procedure for the fingerprint recognition area, to determine a to-be-scanned sub-area. A quantity of sub-areas is the same as a quantity of fingers in the fingerprint recognition area.

Figure 12:
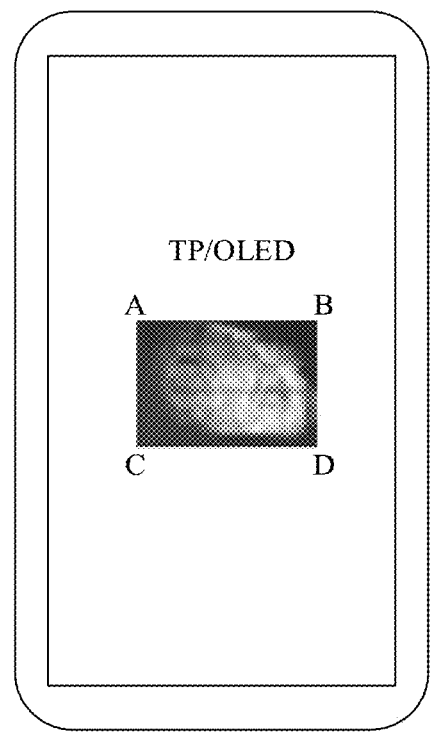
FIG. 12 is a schematic diagram of a range of a fingerprint recognition area according to an embodiment of this application.

Specifically, as shown in FIG. 12, the touch integrated circuit 1007 provides a finger touch area for the AP 1010, and determines the fingerprint recognition area based on the finger touch area. The fingerprint recognition area is greater than and includes the finger touch area. A specific pixel is left on a non-overlapping part between the fingerprint recognition area and the finger touch area, for example, an ABCD area in FIG. 12 is a fingerprint recognition area. For example, a value of a length of a line segment AB is 10 mm (corresponding to 220 pixels on a 2K display), and a value of a length of a line segment AC is 12 mm (corresponding to 200 pixels pixel on the 2K display). In this way, coordinates of points A, B, C, and D are finally determined, and a locating process of the fingerprint recognition area is completed.

Further, as described above, the fingerprint recognition area may be divided into a plurality of fingerprint recognition sub-areas for scanning based on an area size of the fingerprint recognition area and an area size of a scanning pattern. This process is a division process of the fingerprint recognition area. A specific implementation may be implemented through the division procedure of the fingerprint area, and there are relatively many implementations for the division procedure. This is not limited in this application.

S3. Read scanning data.

The scanning data is obtained by using a particularly constructed three-dimensional orthogonal matrix. When the smartphone is test during factory delivery, the scanning data is stored in a memory of the smartphone, for example, a nonvolatile memory.

FIG. 13 is a schematic diagram of a three-dimensional four-order matrix according to an embodiment of this application. The three-dimensional four-order matrix includes four two-dimensional matrices: M1[I, J], M2[I, J], M3[I, J], and M4[I, J] respectively, and elements of the matrices are shown in FIG. 13. It should be understood that, the elements in the four two-dimensional matrices shown in FIG. 13 form the scanning pattern in step 304.

Matrix elements located at a same location in the four two-dimensional matrices are extracted to form a column vector $V_{i,j}$. For example, elements (m000, m001, m002, m003) located in the first row and the first column in M1[I, J], M2[I, J], M3[I, J], and M4[I, J] are extracted to obtain a column vector $W_{1,1}$ through arrangement. For example, $W_{1,1}$={m000, m001, m002, m003}, or $W_{1,1}$={m003, m002, m001, m000}. It is easy to learn that, there are a total of 16 locations in the two-dimensional matrix. Therefore, 16 column vectors may be obtained, and each column vector includes four matrix elements. It should be understood that the 16 column vectors meet the orthogonal conditions described above. It should be noted that m000, m001, m002, and m003 are sequentially matrix elements corresponding to the locations M[1, 1, 1], M[1, 1, 2], M[1, 1, 3], and M[1, 1, 4]. Matrix elements at other matrix locations are deduced by analogy, and details are not described herein.

S4. Generate gray-scale data from the scanning data.

S5. Control light emitting of a pixel in the fingerprint recognition area by using the gray-scale data, and scan the fingerprint recognition area.

A quantity of pixels on the display corresponding to the fingerprint area is usually far greater than a scale of a two-dimensional matrix. For example, a fingerprint area on a 2K display may include 220*200 pixels; however the two-dimensional matrix includes only 4*4 pixels. Therefore, to completely cover the area, a same two-dimensional matrix needs to be used for scanning for a plurality of times. The foregoing three-dimensional four-order orthogonal matrix M[i, j, k] is used as an example to describe a specific scanning process. The specific scanning process is as follows:

1. The AP 1010 writes the element m000 of the first two-dimensional orthogonal matrix into a cache area of the light emitting drive module.

2. The light emitting drive module 1001 generates corresponding gray-scale data from the matrix element m000.

3. The light emitting drive module 1001 outputs the gray-scale data to the control logic module 10052 of the display.

4. The control logic module 10052 simultaneously lights up three sub-pixels RGB corresponding to m000 in an upper left corner of the fingerprint area, and therefore, a pixel emits white light, where intensity of the white light depends on the gray-scale data. Light emitting modulation of the pixel on the display is implemented in this way.

5. Repeat 1 to 4 until scanning of scanning data m000, m010, m020, and m030 is completed.

6. Repeat 5, that is, repeatedly perform scanning by using the data m000, m010, m020, and m030 again (possibly for a plurality of times) until scanning of the first row in the fingerprint area is completed (for example, in the scenario in this embodiment, because the length of the line segment AB is 220 pixels, and 220/4=55, the line segment AB can be covered only after 54 times of repetition).

7. Similar to 6, complete scanning of the second row in the fingerprint area by using m100, m110, m120, and m130, and by analogy, complete scanning of all rows (for the line segment AC, 200/4=50, and step 7 needs to be repeated for 49 times before the line segment AC is covered; therefore, the area ABCD in which the entire fingerprint is located needs 55×50=2750 two-dimensional matrices M1[i, j] before the area ABCD can be covered).

8. Repeat 1 to 7 to complete scanning, by using the other three matrices M2[I, J], M3[I, J], and M4[I, J], of the area ABCD in which the same fingerprint is located.

Persons skilled in the art may understand that the "repetition" mentioned above is not exactly the same, but adaptive adjustment needs to be performed on new data. For example, in step 5, when the data m010 is used for scanning, m000 in steps 1, 2, 3, and 4 needs to be replaced with m010. Other steps are similar, and details are not described herein again.

Figure 14:
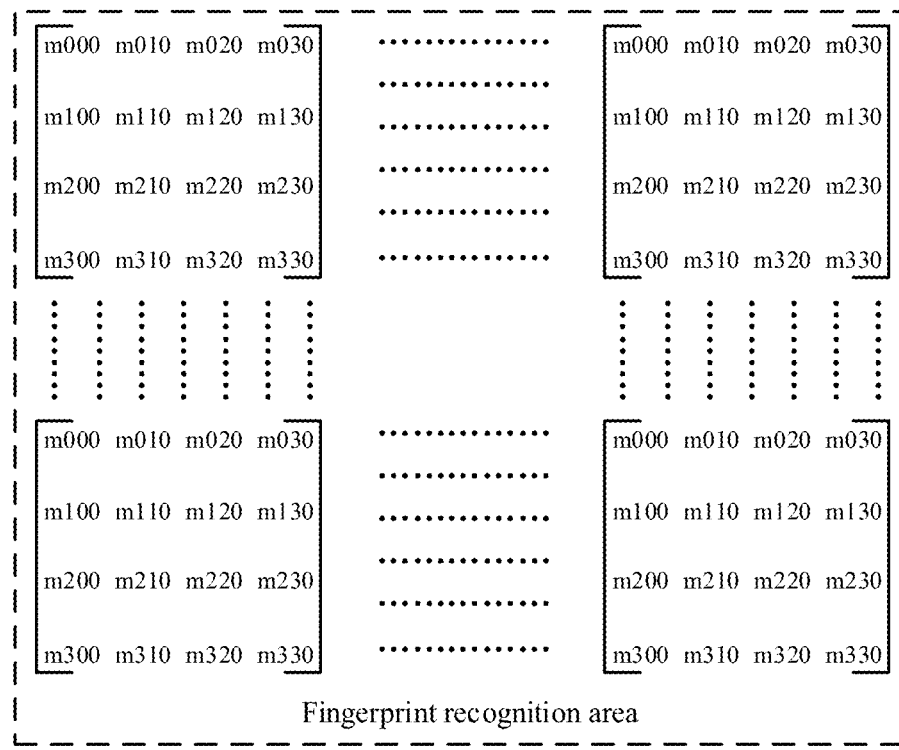
FIG. 14 (a) is a schematic diagram of fingerprint scanning of a two-dimensional matrix according to an embodiment of this application.
Figure 14:
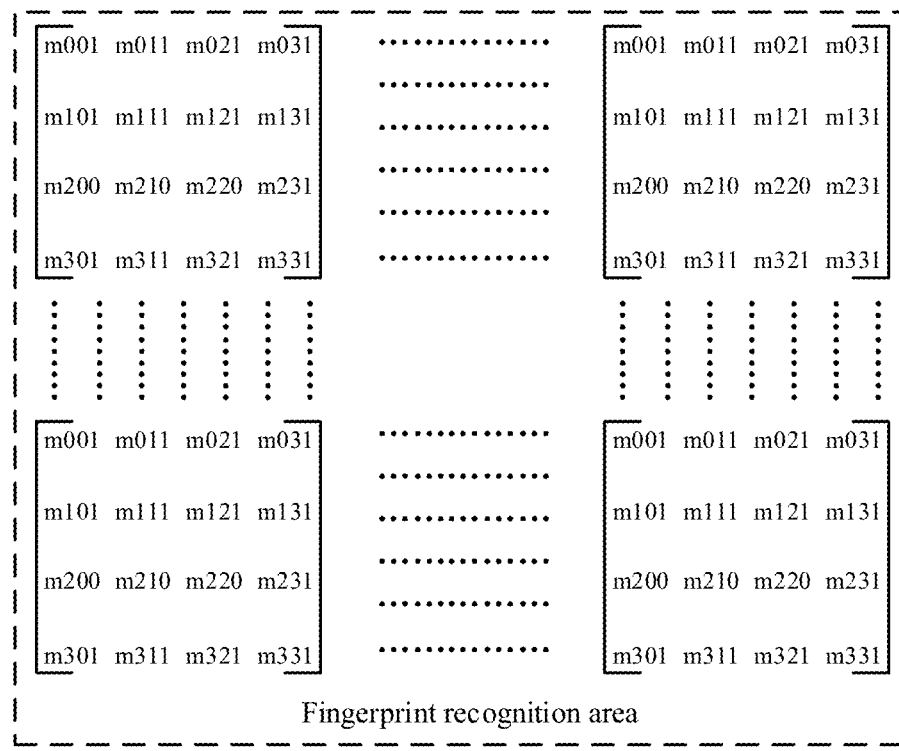
Figure 14:
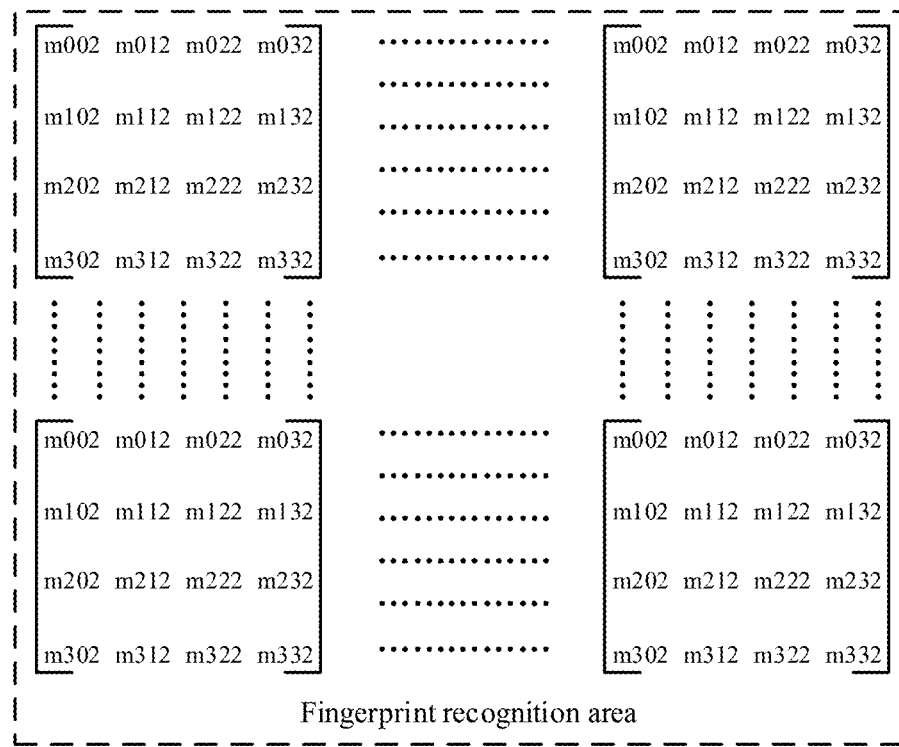
Figure 14:
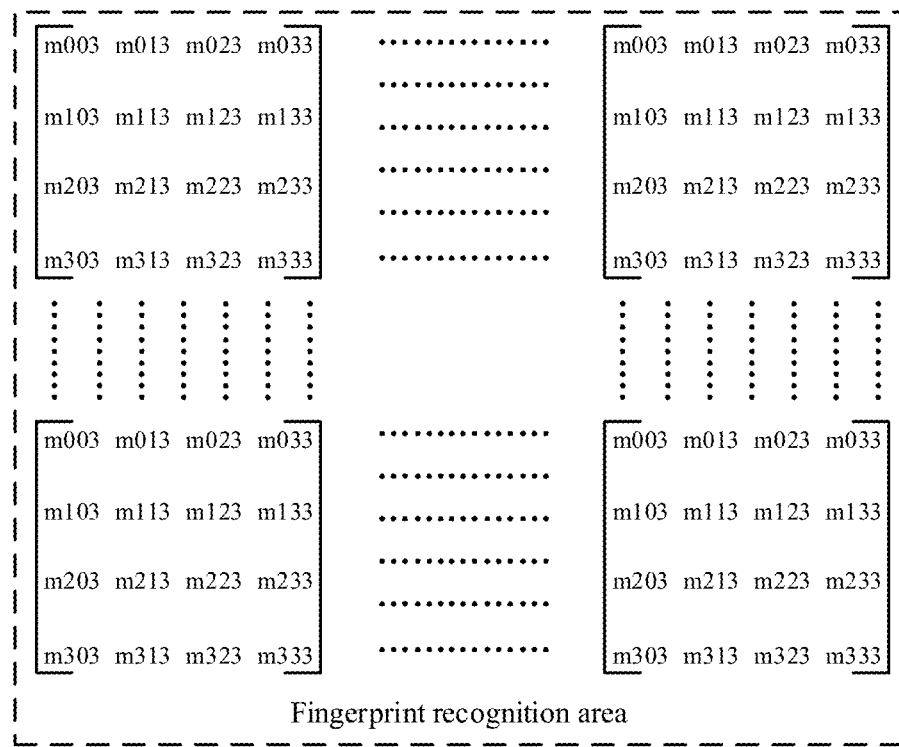

FIG. 14 (*a*) is a schematic scanning diagram of scanning a fingerprint recognition area by using the two-dimensional matrix M1[I, J] shown in FIG. 13. FIG. 14 (*b*) is a schematic scanning diagram of scanning a fingerprint recognition area by using the two-dimensional matrix M2[I, J] shown in FIG. 13. FIG. 14 (*c*) is a schematic scanning diagram of scanning a fingerprint recognition area by using the two-dimensional matrix M3[I, J] shown in FIG. 13. FIG. 14 (*d*) is a schematic scanning diagram of scanning a fingerprint recognition area by using the two-dimensional matrix M4[I, J] shown in FIG. 13.

S6. Read data in a PD corresponding to the pixel, where the PD is included in the fingerprint module 1008.

S7. Determine whether scanning of the entire fingerprint recognition area is completed, and if scanning of the entire fingerprint recognition area is not completed, jump to S3 to continue scanning.

S8. If scanning of the entire fingerprint recognition area is completed, determine whether a quantity of scanning times is equal to K; and if the quantity of scanning times is not equal to K, jump to S3 to continue scanning.

S9. If the quantity of scanning times is equal to K, obtain fingerprint information through demodulation based on the scanning data and the data in the PD.

A method in which the AP 1010 reads the data in the PD and demodulates the data in the fingerprint scanning process is as follows:

Step 8: After lighting up a pixel, the AP 1010 sends a read instruction to the fingerprint module integrated circuit 1009, and the read instruction is used to read the data in the PD.

Step 9: After receiving the read instruction, the fingerprint module integrated circuit 1009 delays for a period of time Tread, for example, 50 μs. The Tread time is used to wait for the PD to output stable data obtained after optical-to-electrical conversion.

Step 10: After the Tread time expires, the fingerprint module integrated circuit 1009 searches a correspondence table (pixel, PD) between a pixel pixel and a PD, reads data from the PD corresponding to the pixel, and stores the data in a cache area, where the data is original fingerprint data.

Step 11: Repeat steps 8 to 10 to complete reading data of a PD corresponding to each of the two-dimensional matrices M[i, j, 0], M[i, j, 1], M[i, j, 2], and M[i, j, 3], and store all the data in the cache area.

Step 12: The AP 1010 reads the original fingerprint data from the cache area to form a vector $V_{i,j}$=(mij0, mij1, vij2, vij3). Four components of $V_{i,j}$ are four responses obtained on a corresponding PD after four times of light emitting modulation are performed on a same pixel on the display by using data (mij0, mij1, mij2, mij3) (converted into gray-scale data) at a same location (i, j) in four two-dimensional matrices, that is, four pieces of original fingerprint data, including a wanted signal and an interference signal.

Step 13: Perform a correlation operation (a vector inner product operation) on the original fingerprint data vector $V_{i,j}$ and a column vector $W_{i,j}$ in a Z direction of a four-dimensional matrix used to light up the corresponding pixel, that is, $V_{i,j}*W_{i,j}=P_{i,j}$, where $P_{i,j}$ is a fingerprint reflected signal obtained after adjacent channel interference and ambient light interference are reduced for the corresponding pixel; and write $P_{i,j}$ into a data cache area for invoking by a fingerprint recognition module subsequently.

Step 14: Repeat steps 8 to 13 to complete correlation operations on all pixels corresponding to the fingerprint area, where a set of all obtained $P_{i,j}$ is a final fingerprint reflected signal.

It should be noted that after data on all PDs is read and stored, the data on the PDs needs to be cleared. Otherwise, residual data on the PDs affects next fingerprint imaging.

The foregoing content describes in detail the fingerprint information obtaining method provided in this application. The following describes in detail a fingerprint recognition apparatus that implements the fingerprint information obtaining method.

Figure 15:
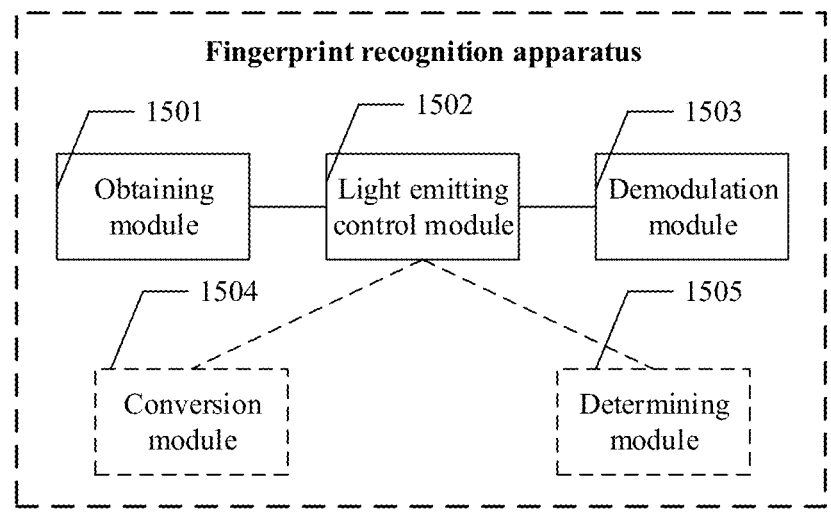
FIG. 15 is a schematic diagram of an embodiment of a fingerprint recognition apparatus according to an embodiment of this application.

FIG. 15 is a schematic diagram of an embodiment of a fingerprint recognition apparatus according to an embodiment of this application. Based on the foregoing embodiments, as shown in FIG. 15, the fingerprint recognition apparatus provided in this embodiment of this application includes:

an obtaining module 1501, configured to: if a start operation on a terminal screen is detected, obtain a first vector set, where the first vector set includes A data vectors that are mutually orthogonal, each of the data vectors includes a plurality of data elements, and A is an integer greater than 1;

a light emitting control module 1502, configured to sequentially use the data elements in each of the data vectors to control light emitting of minimum pixel units in a fingerprint recognition area until controlling light emitting of all the minimum pixel units in the fingerprint recognition area is completed, to obtain a second vector set corresponding to the fingerprint recognition area, where the second vector set carries fingerprint information; and a demodulation module 1503, configured to demodulate the second vector set by using the first vector set to obtain all fingerprint information in the fingerprint recognition area.

It should be noted that the obtaining module 1501 may be implemented based on the fingerprint scanning control circuit 101 in FIG. 1. For a specific function of the obtaining module 1501, refer to related descriptions in step 201 in FIG. 2 and step 303 in FIG. 3. Details are not described herein again. Likewise, the light emitting control module 1502 may be implemented based on the optical sensor component 103 and the fingerprint information collection front-end processing circuit 104 in FIG. 1. For a specific function of the light emitting control module 1502, refer to related descriptions in steps 202 and 203 in FIG. 2 and steps 304 and 305 in FIG. 3. Details are not described herein again. The demodulation module 1503 may be implemented based on the fingerprint information post-processing circuit 105 in FIG. 1. For a specific function of the demodulation module 1503, refer to related descriptions in step 204 in FIG. 2 and step 306 in FIG. 3. Details are not described herein again.

In an example, the first vector set is constructed by using a three-dimensional matrix M[I, J, K], I, J, and K are sequentially dimensions of the three-dimensional matrix M[I, J, K] in X, Y, and Z directions, column vectors that are at different coordinate locations on X and Y planes in the three-dimensional matrix M[I, J, K] are mutually orthogonal, A is equal to a product of I and J, one data vector is any column vector that is at a same coordinate location on the X and Y planes in the three-dimensional matrix M[I, J, K], and one data vector includes K data elements. For a specific method for constructing the first vector set by using the three-dimensional matrix and other related descriptions, refer to related descriptions of the three-dimensional matrix M[I, J, K] in step 201 and related descriptions of the scanning data in step 303. Details are not described herein again.

In another example, one data vector may be corresponding to one minimum pixel unit, or may be corresponding to a plurality of minimum pixel units. In addition, in the foregoing two correspondences, one minimum pixel unit may include only one pixel, or may include a plurality of pixels. For descriptions of the correspondence between the data vector and the minimum element, refer to related descriptions of controlling the light emitting process in step 203 and similar descriptions of the correspondence between the pixel and the PD in step 301. Details are not described herein again.

In another example, the second vector set includes A fingerprint vectors, and the fingerprint vectors include fingerprint information collected in the light emitting process of the minimum pixel unit. For related descriptions of the second vector set, refer to the descriptions of the demodulation part in step 204. This is not limited herein.

In another example, the fingerprint recognition apparatus further includes a conversion module 1504. The conversion module 1504 is configured to convert the data element in each data vector into standardized display data. The standardized display data is used to control light emitting of the minimum pixel units. Specifically, when the standardized display data includes gray-scale data, the conversion module 1504 is specifically configured to: convert the data element in each data vector into the gray-scale data according to Formula 1 or Formula 2. Formula 1 is $y=(2^n-1)*((m[i, j, k])-\min)/(\max-\min)$. Formula 2 is $y=(2^n-1)*\sin\{0.5*\pi*((m[i, j, k])-\min)/(\max-\min)\}$. In Formula 1 and Formula 2, y is the gray-scale data, n is a quantity of bits of the gray-scale data, $m[i, j, k]$ is any data element in the first vector set, $i \in [1, I]$, $j \in [1, J]$, $k \in [1, K]$, max is a maximum element value in the first vector set, and min is a minimum element value in the first vector set. For other related descriptions of the foregoing gray-scale data conversion, refer to the related descriptions in FIG. 6 and FIG. 7. Details are not described herein again.

In another example, the fingerprint recognition area includes N fingerprint recognition sub-areas, N is an integer greater than 1, and the start operation is a touch operation. The fingerprint recognition apparatus further includes: a determining module 1505, configured to: if a touch operation on the terminal display is detected, determine the fingerprint recognition area based on an operation area corresponding to the touch operation, and divide the fingerprint recognition area into the N fingerprint recognition sub-areas, where the operation area is within an area range of the fingerprint recognition area. For other related descriptions of dividing the fingerprint recognition area into a plurality of fingerprint recognition sub-areas, refer to the related descriptions of step 304 and FIG. 8. Details are not described herein again.

In this embodiment, other descriptions of the fingerprint recognition apparatus include but are not limited to the descriptions in FIG. 2, FIG. 3, FIG. 10, and FIG. 11. Details are not described herein again.

Figure 16:
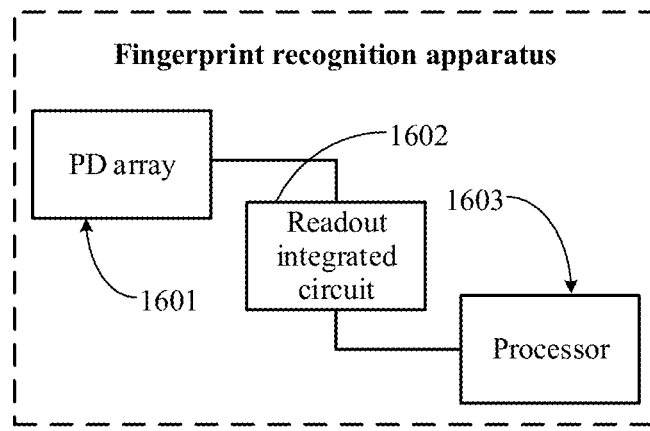
FIG. 16 is a schematic diagram of an embodiment of another fingerprint recognition apparatus according to an embodiment of this application.

FIG. 16 is a schematic diagram of an embodiment of another fingerprint recognition apparatus according to an embodiment of this application. Based on the foregoing embodiments, as shown in FIG. 16, this embodiment of this application provides the another fingerprint recognition apparatus. The apparatus may be various mobile terminals (for example, a mobile phone and a tablet computer), or may be various other electronic devices having a fingerprint recognition function. The apparatus includes: a PD array 1601, a readout integrated circuit 1602, and a processor 1603.

The processor 1603 may be a general purpose processor (such as a CPU). The general purpose processor may be packaged together with another circuit in a chip to form a system-on-a-chip (SoC), also referred to as an AP (application processor), or an AP chip, for example, a processor of Huawei Kirin series, a processor of Qualcomm Snapdragon series, or may be another integrated circuit chip. This is not limited in this application.

In another example, the readout integrated circuit 1602 may specifically integrate one or more of the fingerprint scanning control circuit 101, the fingerprint information collection front-end processing circuit 104, and the fingerprint information post-processing circuit 105 in the embodiment corresponding to FIG. 1. The readout integrated circuit 1602 may be an integrated circuit implemented based on an ASIC, an FPGA, or the like. The foregoing three circuits may be packaged into one chip, or one or more of the circuits are separately packaged into one chip.

In another example, the general purpose processor (such as a CPU) may execute a corresponding operation instruction, to implement functions of one or more of the fingerprint scanning control circuit 101, the fingerprint information collection front-end processing circuit 104, and the fingerprint information post-processing circuit 105 in the embodiment corresponding to FIG. 1.

In an example, the fingerprint recognition apparatus may further include a storage device. The storage device may be a built-in memory of the processor 1603, or may be an external memory (such as various ROMs, flash, magnetic disks, or compact discs) connected to the processor 1603. The storage device is configured to store scanning data constructed by using a three-dimensional matrix, fingerprint data obtained by scanning a fingerprint area, and an operation instruction, so that the processor 1603 can invoke the operation instruction to perform the fingerprint information obtaining method according to the embodiments of this application.

Compared with the optical fingerprint recognition system in FIG. 1, the fingerprint recognition apparatus in this embodiment may integrate at least one function circuit of the fingerprint scanning control circuit 101, the fingerprint information post-processing circuit 105, and the fingerprint recognition application circuit 106 into the processor 1603, so that the processor 1603 performs the fingerprint information obtaining method.

In another example, the fingerprint apparatus may further include the OLED display in the hardware system structure of the fingerprint recognition system on the smartphone in FIG. 10. The application processor AP 1010 is used as a processor to perform the fingerprint information obtaining method.

In this embodiment, for other descriptions of the fingerprint recognition apparatus, refer to the descriptions in FIG. 1, FIG. 10, FIG. 2, and FIG. 3. Details are not described herein again.

This application further provides a computer storage medium, and the computer storage medium is applicable to an optical fingerprint recognition system. The computer storage medium includes an operation instruction, and when the operation instruction is run on a computer, the computer may be enabled to perform related operations in steps 201 to 204 in FIG. 2 and steps 301 to 306 in FIG. 3. The computer storage medium may be specifically the built-in memory in the processor 1603, or the external memory connected to the processor 1603.

This application further provides a computer program product. When the computer program product is run on a computer, the computer is enabled to perform all operations described in the FIG. 2 or FIG. 3.

It may be clearly understood by persons skilled in the art that for convenient and brief description, for a detailed working process of the described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may have another division manner in actual implementation. For example, a plurality of modules or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in electrical, mechanical, or another form.

Each of the functional modules in the embodiments of this application may be integrated into one processing module, each of the modules may exist alone physically, or at least two modules are integrated into one module. The integrated module may be implemented in a form of hardware, or may be implemented in a form of a software function module.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A fingerprint recognition apparatus, comprising:
a memory and a processor; wherein
the memory is configured to store an operation instruction; and
the processor is configured to invoke the operation instruction to perform the fingerprint information obtaining method comprising:
if a start operation on a terminal screen is detected, obtaining a first vector set, wherein the first vector set comprises A data vectors that are mutually orthogonal or mutually quasi-orthogonal, each of the data vectors comprises a plurality of data elements, and A is an integer greater than 1;
sequentially using the data elements in each of the data vectors to control light emitting of minimum pixel units in a fingerprint recognition area until controlling light emitting of all the minimum pixel units in the fingerprint recognition area is completed, to obtain a second vector set corresponding to the fingerprint recognition area, wherein the second vector set carries fingerprint information; and
demodulating the second vector set by using the first vector set to obtain all fingerprint information in the fingerprint recognition area.

2. The fingerprint recognition apparatus according to claim 1, wherein,
the sequentially using the data elements in each of the data vectors to control light emitting of minimum pixel units in a fingerprint recognition area comprises:
(1) first using data elements with a same sequence number in all the data vectors, to control light emitting of the minimum pixel units in predetermined order;
(2) further using data elements with another same sequence number in all the data vectors, to control light emitting of the minimum pixel units in the predetermined order;
(3) repeatedly performing processes in (1) and (2) until data elements with a last same sequence number in all the data vectors are used to control light emitting of the minimum pixel units in the fingerprint recognition area; and (4) if the controlling light emitting of all the minimum pixel units in the fingerprint recognition area is still not completed, repeatedly performing processes in (1), (2), and (3) until completion.

3. The fingerprint recognition apparatus according to claim 1, wherein the first vector set is constructed by using a three-dimensional matrix M[I, J, K], I, J, and K are sequentially dimensions of the three-dimensional matrix M[I, J, K] in X, Y, and Z directions, column vectors that are at different coordinate locations on X and Y planes in the three-dimensional matrix M[I, J, K] are mutually orthogonal or mutually quasi-orthogonal, A is equal to a product of I and J, one of the data vectors is any column vector that is at a same coordinate location on the X and Y planes in the three-dimensional matrix M[I, J, K], and one of the data vectors comprises K data elements.

4. The fingerprint recognition apparatus according to claim 2, wherein one of the data vectors is corresponding to one or more minimum pixel units, and one of the minimum pixel units comprises one or more pixels.

5. A fingerprint recognition apparatus, comprising:

an obtaining module, configured to: if a start operation on a terminal screen is detected, obtain a first vector set, wherein the first vector set comprises A data vectors that are mutually orthogonal or mutually quasi-orthogonal, each of the data vectors comprises a plurality of data elements, and A is an integer greater than 1;

a light emitting control module, configured to sequentially use the data elements in each of the data vectors to control light emitting of minimum pixel units in a fingerprint recognition area until controlling light emitting of all the minimum pixel units in the fingerprint recognition area is completed, to obtain a second vector set corresponding to the fingerprint recognition area, wherein the second vector set carries fingerprint information; and a demodulation module, configured to demodulate the second vector set by using the first vector set to obtain all fingerprint information in the fingerprint recognition area.

6. The apparatus according to claim 5, wherein the light emitting control module is specifically configured to perform the following operations:

(1) first using data elements with a same sequence number in all the data vectors, to control light emitting of the minimum pixel units in predetermined order;

(2) further using data elements with another same sequence number in all the data vectors, to control light emitting of the minimum pixel units in the predetermined order;

(3) repeatedly performing processes in (1) and (2) until data elements with a last same sequence number in all the data vectors are used to control light emitting of the minimum pixel units in the fingerprint recognition area; and (4) if the controlling light emitting of all the minimum pixel units in the fingerprint recognition area is still not completed, repeatedly performing processes in (1), (2), and (3) until completion.

7. The apparatus according to claim 5, wherein the first vector set is constructed by using a three-dimensional matrix M[I, J, K], I, J, and K are sequentially dimensions of the three-dimensional matrix M[I, J, K] in X, Y, and Z directions, column vectors that are at different coordinate locations on X and Y planes in the three-dimensional matrix M[I, J, K] are mutually orthogonal or mutually quasi-orthogonal, A is equal to a product of I and J, one of the data vectors is any column vector that is at a same coordinate location on the X and Y planes in the three-dimensional matrix M[I, J, K], and one of the data vectors comprises K data elements.

8. The apparatus according to claim 6, wherein one of the data vectors is corresponding to one or more minimum pixel units, and one of the minimum pixel units comprises one or more pixels.

9. The apparatus according to claim 5, wherein the second vector set comprises the A fingerprint vectors, and the fingerprint vector comprises fingerprint information collected in a light emitting process of the minimum pixel unit; and the demodulation module is specifically configured to perform a vector inner product operation by using a data vector and a fingerprint vector that are corresponding to a same minimum pixel unit, until vector inner product operations corresponding to all the minimum pixel units in the fingerprint recognition area are completed, to obtain all the fingerprint information in the fingerprint recognition area.

10. The apparatus according to claim 5, wherein the fingerprint recognition apparatus further comprises:

a conversion module, configured to convert the data element in each of the data vectors into standardized display data, wherein the standardized display data is used to control light emitting of the minimum pixel units.

11. The apparatus according to claim 10, wherein the standardized display data comprises gray-scale data, and the conversion module is specifically configured to:

convert the data element in each of the data vectors into the gray-scale data according to Formula 1 or Formula 2, wherein $$y=(2^n-1)*((m[i,j,k])-\min)/(\max-\min);\qquad\text{Formula 1}$$

$$y=(2^n-1)*\sin\{0.5*R*((m[i,j,k])-\min)/(\max-\min)\};\qquad\text{Formula 2}$$

and in Formula 1 and Formula 2, y is the gray-scale data, n is a quantity of bits of the gray-scale data, m[i, j, k] is any data element in the first vector set, $i\in[1, I]$, $j\in[1, J]$, $k\in[1, K]$, max is a maximum element value in the first vector set, and min is a minimum element value in the first vector set.

12. The apparatus according to claim 5, wherein the fingerprint recognition area comprises N fingerprint recognition sub-areas, N is an integer greater than 1, the start operation is a touch operation, and the fingerprint recognition apparatus further comprises:

a determining module, configure to: if the touch operation on the terminal display is detected, determine the fingerprint recognition area based on an operation area corresponding to the touch operation, and divide the fingerprint recognition area into the N fingerprint recognition sub-areas, wherein the operation area is within an area range of the fingerprint recognition area.

13. A fingerprint information obtaining method, comprising:

if a start operation on a terminal screen is detected, obtaining a first vector set, wherein the first vector set comprises A data vectors that are mutually orthogonal or mutually quasi-orthogonal, each of the data vectors comprises a plurality of data elements, and A is an integer greater than 1;

sequentially using the data elements in each of the data vectors to control light emitting of minimum pixel units in a fingerprint recognition area until controlling light emitting of all the minimum pixel units in the fingerprint recognition area is completed, to obtain a second vector set corresponding to the fingerprint recognition area, wherein the second vector set carries fingerprint information; and demodulating the second vector set by using the first vector set to obtain all fingerprint information in the fingerprint recognition area.

14. The method according to claim 13, wherein
the sequentially using the data elements in each of the data vectors to control light emitting of minimum pixel units in a fingerprint recognition area comprises:
(1) first using data elements with a same sequence number in all the data vectors, to control light emitting of the minimum pixel units in predetermined order;
(2) further using data elements with another same sequence number in all the data vectors, to control light emitting of the minimum pixel units in the predetermined order;
(3) repeatedly performing processes in (1) and (2) until data elements with a last same sequence number in all the data vectors are used to control light emitting of the minimum pixel units in the fingerprint recognition area; and
(4) if the controlling light emitting of all the minimum pixel units in the fingerprint recognition area is still not completed, repeatedly performing processes in (1), (2), and (3) until completion.

15. The method according to claim 13, wherein
the first vector set is constructed by using a three-dimensional matrix M[I, J, K], I, J, and K are sequentially dimensions of the three-dimensional matrix M[I, J, K] in X, Y, and Z directions, column vectors that are at different coordinate locations on X and Y planes in the three-dimensional matrix M[I, J, K] are mutually orthogonal or mutually quasi-orthogonal, A is equal to a product of I and J, one of the data vectors is any column vector that is at a same coordinate location on the X and Y planes in the three-dimensional matrix M[I, J, K], and one of the data vectors comprises K data elements.

16. The method according to claim 14, wherein
one of the data vectors is corresponding to one or more minimum pixel units, and one of the minimum pixel units comprises one or more pixels.

17. The method according to claim 13, wherein
the second vector set comprises A fingerprint vectors, and the fingerprint vector comprises fingerprint information collected in a light emitting process of the minimum pixel unit; and
the demodulating the second vector set by using the first vector set to obtain all fingerprint information in the fingerprint recognition area comprises:
performing a vector inner product operation by using a data vector and a fingerprint vector that are corresponding to a same minimum pixel unit, until vector inner product operations corresponding to all the minimum pixel units in the fingerprint recognition area are completed, to obtain all the fingerprint information in the fingerprint recognition area.

18. The method according to claim 13, wherein
before the sequentially using the data elements in each of the data vectors to control light emitting of minimum pixel units in the fingerprint recognition area, the method further comprises:
converting the data element in each of the data vectors into standardized display data, wherein the standardized display data is used to control light emitting of the minimum pixel units.

19. The method according to claim 18, wherein
the standardized display data comprises gray-scale data, and the converting the data element in each of the data vectors into standardized display data comprises:
converting the data element in each of the data vectors into the gray-scale data according to Formula 1 or Formula 2, wherein $$y=(2^n-1)*((m[i,j,k])-\min)/(\max-\min); \quad \text{Formula 1}$$

$$y=(2^n-1)*\sin\{0.5*\pi*((m[i,j,k])-\min)/(\max-\min)\}; \quad \text{Formula 2}$$

and
in Formula 1 and Formula 2, y is the gray-scale data, n is a quantity of bits of the gray-scale data, m[i, j, k] is any data element in the first vector set, $i\in[1, I]$, $j\in[1, J]$, $k\in[1, K]$, max is a maximum element value in the first vector set, and min is a minimum element value in the first vector set.

20. The method according to claim 13, wherein
the fingerprint recognition area comprises N fingerprint recognition sub-areas, N is an integer greater than 1, the start operation is a touch operation, and the method further comprises:
if the touch operation on the terminal screen is detected, determining the fingerprint recognition area based on an operation area corresponding to the touch operation, and dividing the fingerprint recognition area into the N fingerprint recognition sub-areas, wherein the operation area is within an area range of the fingerprint recognition area.

* * * * *